(12) United States Patent
Demas et al.

(10) Patent No.: US 9,344,725 B2
(45) Date of Patent: *May 17, 2016

(54) ERROR CONCEALMENT FOR MPEG DECODING WITH PERSONAL VIDEO RECORDING FUNCTIONALITY

(71) Applicant: BROADCOM CORPORATION, Irvine, CA (US)

(72) Inventors: Jason C. Demas, Irvine, CA (US); Sandeep Bhatia, Benson Town (IN); Xuemin "Sherman" Chen, Rancho Santa Fe, CA (US); Srinivasa Mogathala Prabhakara Reddy, Bangalore (IN); Girish Raghunath Hulmani, Jeevan Beemanager (IN); Marcus Kellerman, San Diego, CA (US); Ramanujan Valmiki, Bangalore (IN); Lakshmikanth Pai, Bangalore (IN); Pramod Chandraiah, Bangalore (IN); Mahadevan Sivagururaman, Bangalore (IN); Glen A. Grover, Poway, CA (US); Bhaskar Sherigar, Andover, MA (US); Vivian Hsiun, Yorba Linda, CA (US); Benjamin S. Giese, Oceanside, CA (US)

(73) Assignee: BROADCOM CORPORATION, Irvine, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/897,773

(22) Filed: May 20, 2013

(65) Prior Publication Data

US 2013/0272433 A1    Oct. 17, 2013

Related U.S. Application Data

(63) Continuation of application No. 12/409,439, filed on Mar. 23, 2009, now Pat. No. 8,472,531, which is a continuation of application No. 10/060,118, filed on Jan. 29, 2002, now Pat. No. 7,508,874.

(51) Int. Cl.
| | |
|---|---|
| H04N 19/89 | (2014.01) |
| H04N 19/65 | (2014.01) |
| H04N 21/236 | (2011.01) |
| H04N 21/4147 | (2011.01) |
| H04N 21/432 | (2011.01) |
| H04N 21/434 | (2011.01) |
| H04N 21/4402 | (2011.01) |
| H04N 21/442 | (2011.01) |
| H04N 19/895 | (2014.01) |

(52) U.S. Cl.
CPC ......... *H04N 19/00939* (2013.01); *H04N 19/65* (2014.11); *H04N 19/89* (2014.11); *H04N 19/895* (2014.11); *H04N 21/23608* (2013.01); *H04N 21/4147* (2013.01); *H04N 21/4325* (2013.01); *H04N 21/4344* (2013.01); *H04N 21/442* (2013.01); *H04N 21/440245* (2013.01)

(58) Field of Classification Search
CPC .................................................. H04N 19/65
See application file for complete search history.

*Primary Examiner* — Young Lee
(74) *Attorney, Agent, or Firm* — Garlick & Markison; Bruce E. Garlick

(57) ABSTRACT

Error concealment for motion picture expert group (MPEG) decoding with personal video recording functionality. Error concealment of MPEG data may take place within various components within playback, recording, reading and writing data systems. The error concealment may be provided within existing systems whose components may not be capable of accommodating errors within MPEG data. In certain embodiments, the available data that contain no errors is maximized to conceal those portions of the data that do include errors.

20 Claims, 27 Drawing Sheets

ERROR CONCEALMENT FOR MPEG DECODING WITH PERSONAL VIDEO RECORDING FUNCTIONALITY

CROSS-REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/409,439, entitled "Error Concealment for MPEG Decoding with Personal Video Recording Functionality," filed Mar. 23, 2009, which claims priority pursuant to 35 U.S.C. §120, as a continuation, to the following U.S. Utility patent application that is hereby incorporated herein by reference in its entirety and made part of the present U.S. Utility patent application for all purposes:
2. U.S. Utility application Ser. No. 10/060,118, entitled "Error Concealment for MPEG Decoding with Personal Video Recording Functionality," filed Jan. 29, 2002, now issued as U.S. Pat. No. 7,508,874, on Mar. 24, 2009.

SPECIFICATION

1. Technical Field

The embodiments relate generally to video recorder and playback systems; and, more particularly, it relates to error concealment of errors within data that are employed within video recorder and playback systems.

2. Related Art

There is much discussion among the various video and audio data development groups to address the problems of corrupted data and how to deal with such problems; this includes the motion picture expert group (MPEG) discussions regarding dealing with error in MPEG data. However, the MPEG standard does not yet address how to deal with errors within the MPEG data such the data may nevertheless be played back. Typically within such systems, when an error is encountered, a decoder simply bumps out and just dies during the decoding process; the decoder then simply exits. There is typically no recovery from the error in the MPEG data; this portion of MPEG data is treated as being corrupted and remains unused.

The most common approaches to deal with such problems have been very deficient. For example, typical prior art systems cannot deal with errors or corruption within MPEG data. Most prior art systems cannot deal with a corrupted stream of MPEG data at all. There are some proprietary systems and methods that try to deal with errors in MPEG data in some way, yet those approaches typically do not provide a high degree of robustness, and they do not typically or sufficiently address the variety of types of errors that may be encountered within MPEG data. Moreover, these prior art approaches, even when they seek to try to address errors within the MPEG data, are oftentimes unable to deal with any real live streaming of MPEG data that includes some errors. Enormous amounts of time and processing resources are typically required to perform correction to error correction within MPEG data.

BRIEF DESCRIPTION OF THE DRAWINGS

A better understanding can be obtained when the following detailed description of various exemplary embodiments is considered in conjunction with the following drawings.

DETAILED DESCRIPTION OF THE DRAWINGS

Figure 1:
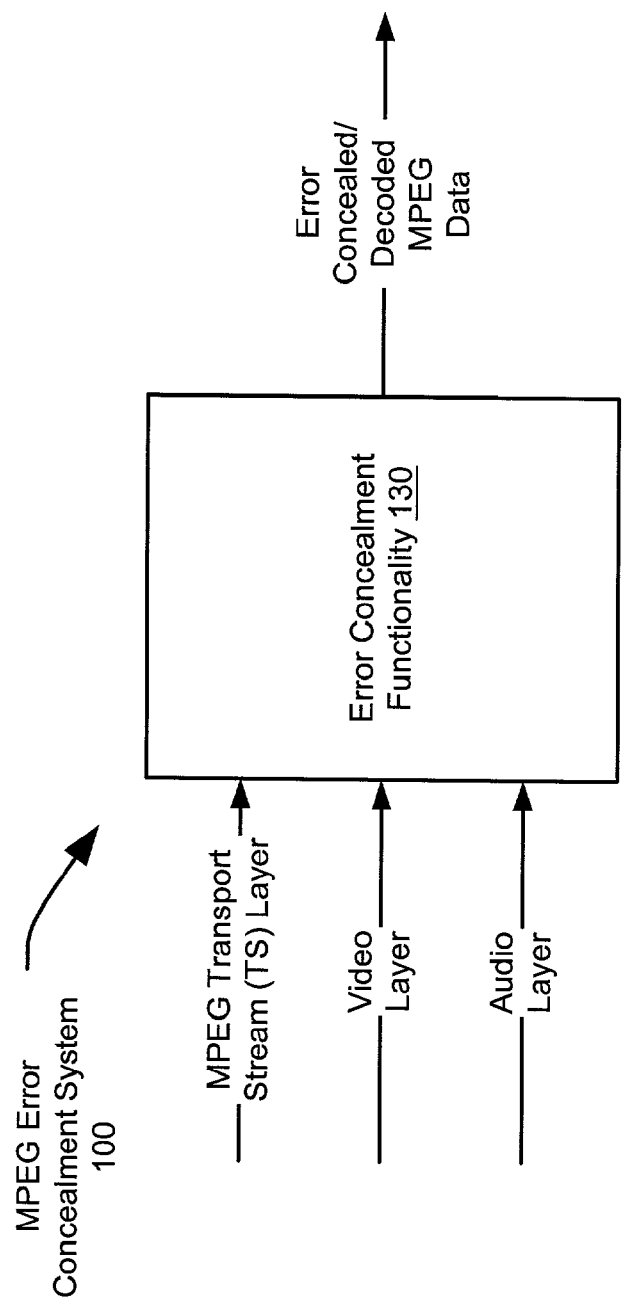
FIG. 1 is a system diagram illustrating an embodiment of a Motion Picture Expert Group (MPEG) error concealment system that is built in accordance with certain aspects of the present embodiments.

A data decode and playback system is operable to perform error concealment for Motion Picture Expert Group (MPEG) data. The system is able to cover errors within MPEG data, to conceal the errors, when the true form of the MPEG data cannot be recovered completely or completely repaired. In doing so, the MPEG data may then be used within any system desiring to perform playback of the MPEG data. From certain perspectives, the data decode and playback system may be viewed as being capable of ensuring that MPEG data, even in the undesirable event that the MPEG data contains some errors, will still be able to play back the MPEG data or at least substantial portions of the MPEG data.

The system is operable to perform decoding and/or playback of MPEG data that may include errors. In various embodiments, decoding of such data may take place during live streaming; for example, when no buffering of data is performed, while still able to perform decoding of the data and ensure error concealment. In other embodiments, error concealment may take place within an MPEG transport processor of data received in MPEG Transport Stream (TS) format. In addition, error concealment can take place on data that is read from some memory storage device, including some MPEG data storage media such as a hard disk.

The data decode and playback system may be implemented within the various components of a personal video recorder, and is operable to perform error concealment of MPEG data within various components within playback, recording, reading, and writing data systems. The data decode and playback system is also operable within existing systems whose components may not be capable of accommodating errors within MPEG data. Whereas previous systems typically cannot deal with any corrupted without either losing the data or suffering some operational failure, the present data decode and playback system is able to conceal these errors and to continue decoding and presentation of the MPEG data. In certain embodiments, this involves maximizing the available data that contain no errors to conceal those portions of the data that do include errors. The data decode and playback system is operable to accommodate various layers while performing error concealment, including the MPEG transport stream layer, the video layer, and the audio layer.

Moreover, the data decode and playback system is able to interface with other components within such systems that do not perform error concealment. For example, the various aspects of error concealment may be performed in one component, that is able to perform error concealment, and that component then provides MPEG data whose errors have been concealed so that the MPEG data may be decoded and played back without suffering any deleterious effects within the overall system. From certain perspectives, the present embodiments may be implemented in an add-on component so that the add-on component may then provide error concealment functionality that benefits other legacy components within the overall system. Alternatively, the data decode and playback system may be implemented via software within an existing component so that the legacy component, after being updated, is then able to perform error concealment. For example, a data transport processor, a video transport processor, an audio transport processor, and/or a decoder built in accordance with the present embodiments may be re-configured so as to provide error concealment functionality.

The data decode and playback system employs many different methods to accommodate the various situations where errors may be encountered during decoding and presentation. Some of these situations include error concealment in time base management, error concealment in live decoding, error concealment of playback, including the situation when a program may be watched and recorded simultaneously. Other situations involve error concealment in MPEG-2 transport processors involving error handling in data transport processors, error handling in video transport, and error handling in audio transport. Other situations involve error concealment of elementary stream decoders including error handling in MPEG-2 video decoders and error handling in audio decoders. In certain embodiments, the various aspects of error concealment include detecting certain types of errors within MPEG data, and in some cases using those error types to categorize the data.

FIG. 1 is a system diagram illustrating an embodiment of a Motion Picture Expert Group (MPEG) error concealment system 100 that is built in accordance with certain aspects of the present embodiments. The MPEG error concealment system 100 is operable to support error concealment functionality 130 in many different layers including an MPEG Transport Stream (TS) layer, a video layer, and an audio layer. Any errors that may have been present in any of the various layers will be concealed within the functional block 130. The output of the functional block 130 will include error concealed/ decoded MPEG data. Any errors will be detected and concealed in such a way that they will not interfere with any subsequent reading, playback, or transmitting of the MPEG data within any other functional blocks or systems. The error concealed/decoded MPEG data will be operable within any MPEG system, and the error concealed/decoded MPEG data will be compatible within any MPEG method.

It is also noted that the present embodiment is operable even when encountering MPEG data that contains no errors whatsoever. The present embodiment is operable to be implemented in conjunction and to interface with systems that are incapable of performing any error concealment. Various embodiments may be arranged so that error concealment is performed within components, implemented in accordance with the present embodiment, so that error concealment is performed within these functional blocks to ensure that any errors within an MPEG TS are in fact concealed as they are transported to other components that are incapable of handling errors within an MPEG TS. This way, those components that are inoperable to accommodate errors and perform proper playback of MPEG TSs having errors will receive an MPEG TS whose errors are concealed; these components will then be able to perform proper decoding process actions and playback process actions.

Figure 2:
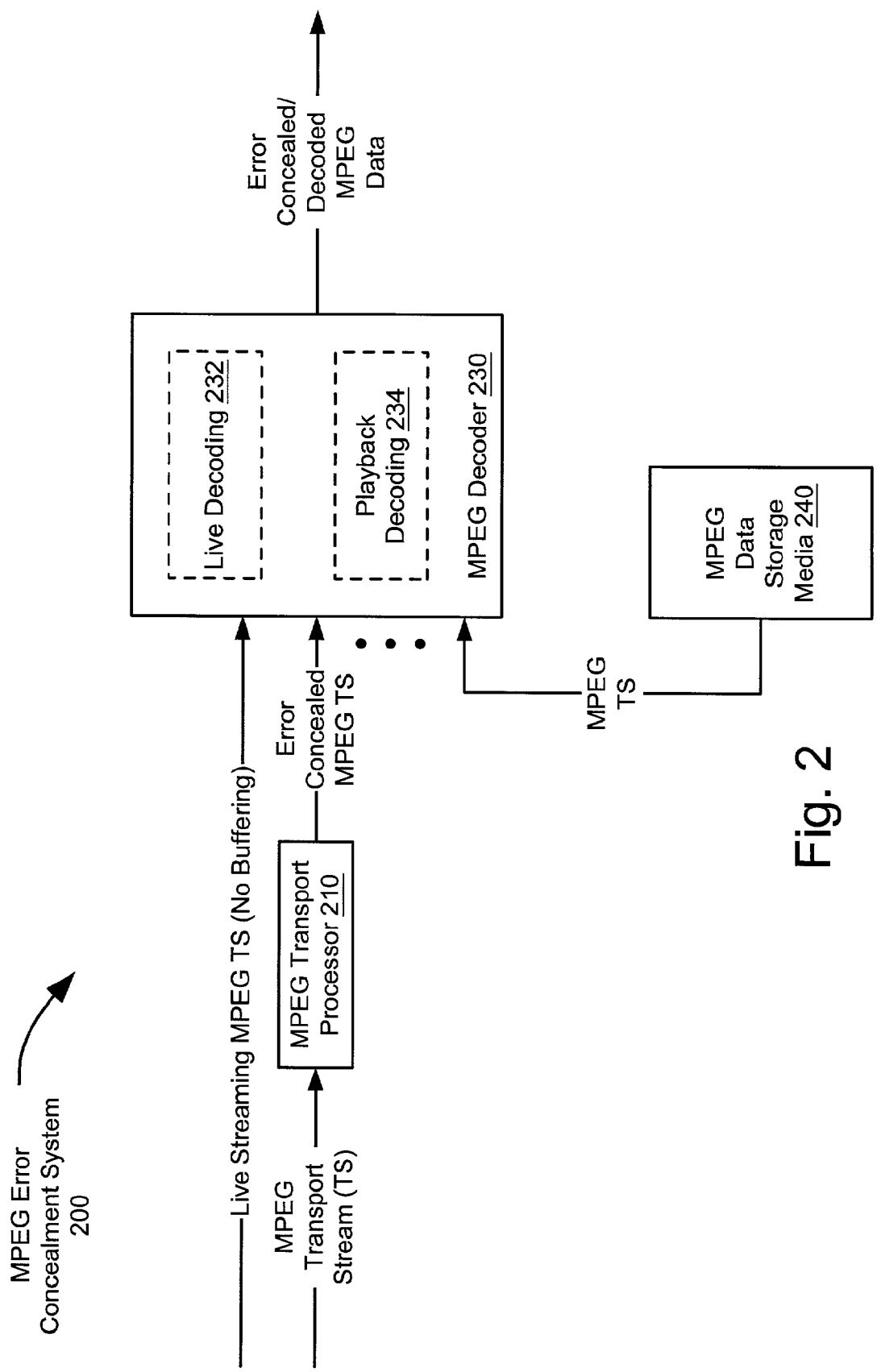
FIG. 2 is a system diagram illustrating another embodiment of an MPEG error concealment system that is built in accordance with certain aspects of the present embodiments.

FIG. 2 is a system diagram illustrating another embodiment of an MPEG error concealment system 200 that is built in accordance with certain aspects of the present embodiments. The FIG. 2 shows a number of ways in which error concealment may be performed on data.

One manner in which error concealment may be performed on an MPEG TS is when an MPEG TS is provided via live streaming to an MPEG decoder 230; this embodiment shows a situation where there is no buffering of an MPEG TS that is provided to the MPEG decoder 230. The MPEG decoder 230 is operable to perform error concealment on the MPEG TS that is received during live streaming to conceal any errors that may be present in the MPEG TS that is provided via live streaming with no buffering. The MPEG decoder 230 is operable to perform decoding on the MPEG TS using live decoding, as shown in a functional block 232, or alternatively, during playback decoding, as shown in a functional block 234. The same MPEG decoder 230 is operable to perform live decoding 232 and playback decoding 234 in certain embodiments.

Another manner in which error concealment may be performed is on an MPEG TS that is provided to an MPEG transport processor 210. This MPEG TS may be viewed as any MPEG TS that is transported between various devices within a communication system. In this situation, the MPEG transport processor 210 performs error concealment on the MPEG TS and then provides an error concealed MPEG TS to the MPEG decoder 230. The MPEG transport processor 210 is operable to perform error concealment of any errors that may be present in the MPEG TS that is received by the MPEG transport processor 210. Alternatively, in other embodiments, the MPEG transport processor 210 may be operable to detect an error in a received MPEG TS packet header; in one situation, the MPEG transport processor 210 merely notifies the MPEG decoder 230 of the existence of this error and passes the MPEG TS packet to the MPEG decoder 230. In other embodiments, the MPEG transport processor 210 is also operable not only to identify the existence of the error, but also to perform error concealment of the error.

Another embodiment showing a way in which error concealment may be performed is when an MPEG TS is received from MPEG data storage media 240. The MPEG data storage media 240 may include any number of various types of data storage media including a hard disk, various types of ROM, RAM, and other data storage media. The MPEG TS is read from the MPEG data storage media 240, and it is then transferred to the MPEG decoder 230. In this situation, the MPEG decoder 230 is operable to perform error concealment of any errors that may be present in the MPEG TS that is received from the MPEG data storage media 240.

The embodiment of the FIG. 2 shows how error concealment may be performed at various stages and places within an MPEG error concealment system. Regardless of whether errors are included within an MPEG TS as it is received via live streaming, or as it is read from MPEG data storage media 240. At any rate, the present embodiment is operable to output and to provide error concealed/decoded MPEG data to any subsequent component. The present embodiment is not only operable to perform error concealment of any errors in various layers of an system (MPEG TS layer, a video layer, and an audio layer), but it is also operable to perform it at various locations within the system as well.

Figure 3:
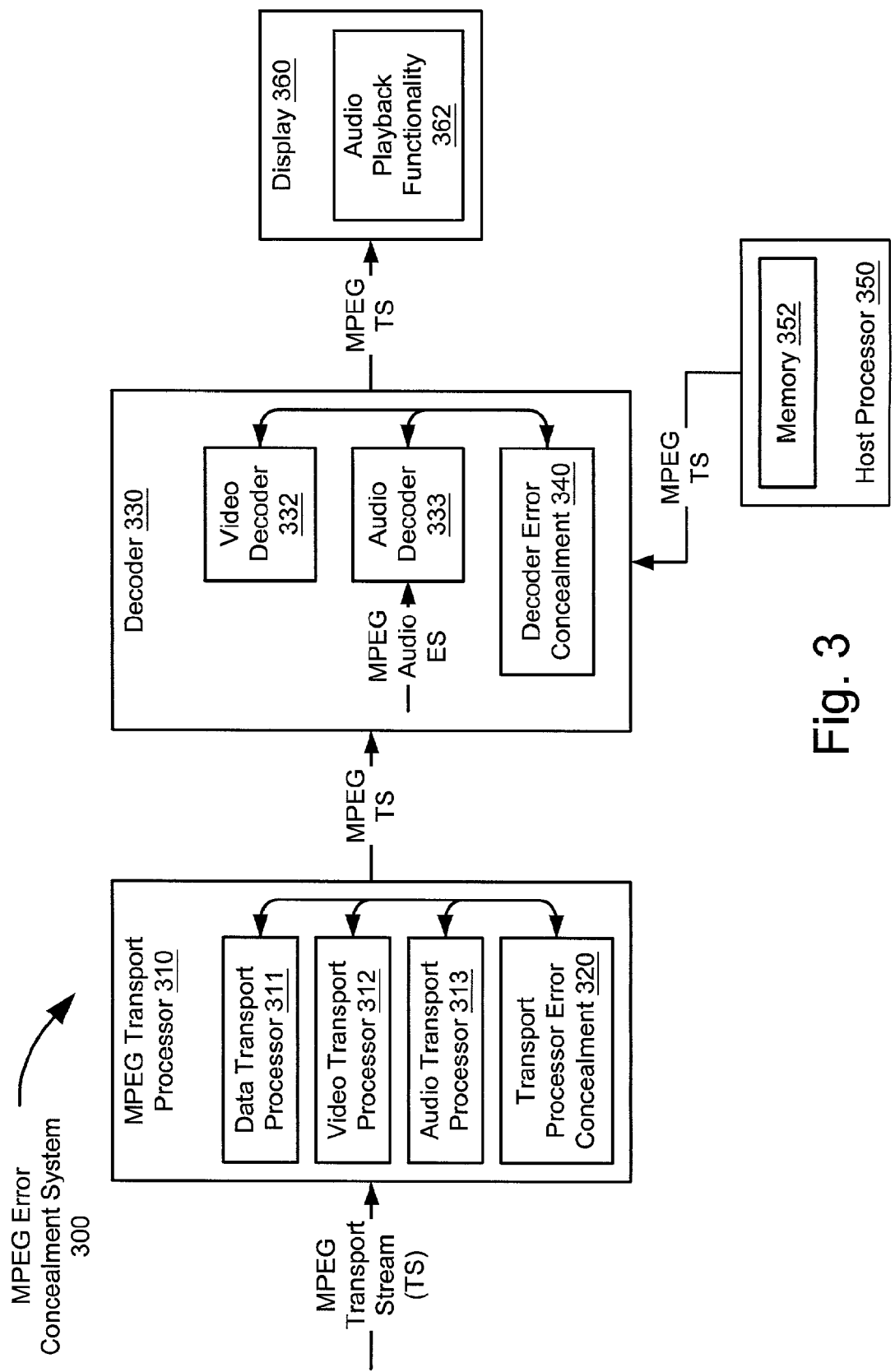
FIG. 3 is a system diagram illustrating another embodiment of an MPEG error concealment system that is built in accordance with certain aspects of the present embodiments.

FIG. 3 is a system diagram illustrating another embodiment of an MPEG error concealment system 300 that is built in accordance with certain aspects of the present embodiment. An MPEG TS is provided to an MPEG transport processor 310. The MPEG transport processor 310 may be viewed as including one or more of a data transport processor 311, a video transport processor 312, and an audio transport processor 313. Each of the data transport processor 311, the video transport processor 312, and the audio transport processor 313 is operable to perform error concealment, as shown by the functional block 320 that shows the functionality of transport processor error concealment. In the event that the received MPEG TS includes any errors, the MPEG transport processor 310 is operable to perform error concealment on the MPEG TS and to provide an MPEG TS whose errors are concealed. The MPEG transport processor 310 provides an MPEG TS to a decoder 330.

The decoder 330 may be viewed as having one or more of a video decoder 332 and an audio decoder 333. Each of the video decoder 332 and the audio decoder 333 is operable to perform decoder error concealment as shown in a functional block 340; the audio decoder 333 is operable to receive and operate on an audio MPEG Elementary Stream (ES). As mentioned above, the decoder 330 is operable to receive an MPEG TS from the MPEG transport processor 310. Alternatively, the decoder 330 is operable to receive an MPEG TS that is provided from a host processor 350; the host processor 350 includes memory 352 that stores the MPEG TS. The memory 352 may include any type of memory known in the art including ROM, RAM, a hard disk and other types of storage media. The decoder 350 is operable to receive the MPEG TS is various manners. The decoder 350 may receive an MPEG TS whose errors may already be concealed, such as an error concealed MPEG TS from the MPEG transport processor 310. Alternatively, the decoder 350 may receive an MPEG TS whose errors may not yet be concealed, such as an MPEG TS containing errors from the host processor 350. In the latter situation, the decoder 330 is operable to perform the error concealment on the MPEG TS. The now error concealed MPEG TS is provided to a display 360. The display 360 is operable to perform video playback, and it is also operable to support audio playback functionality, as shown in a functional block 362.

The embodiment of the FIG. 3 shows how error concealment may be performed at various stages and places within an MPEG error concealment system. Regardless of whether errors are included within an MPEG TS as it is by an MPEG transport processor 310, or whether the MPEG TS is read from memory 352 within a host processor 350. At any rate, the present embodiment is operable to output and to provide error concealed/decoded MPEG data to a display 360. The present embodiment is not only operable to perform error concealment of any errors in various layers of a system (MPEG TS layer, a video layer, and an audio layer), but it is also operable to perform it at various locations within the system as well before attempting to display the MPEG TS.

Figure 4:
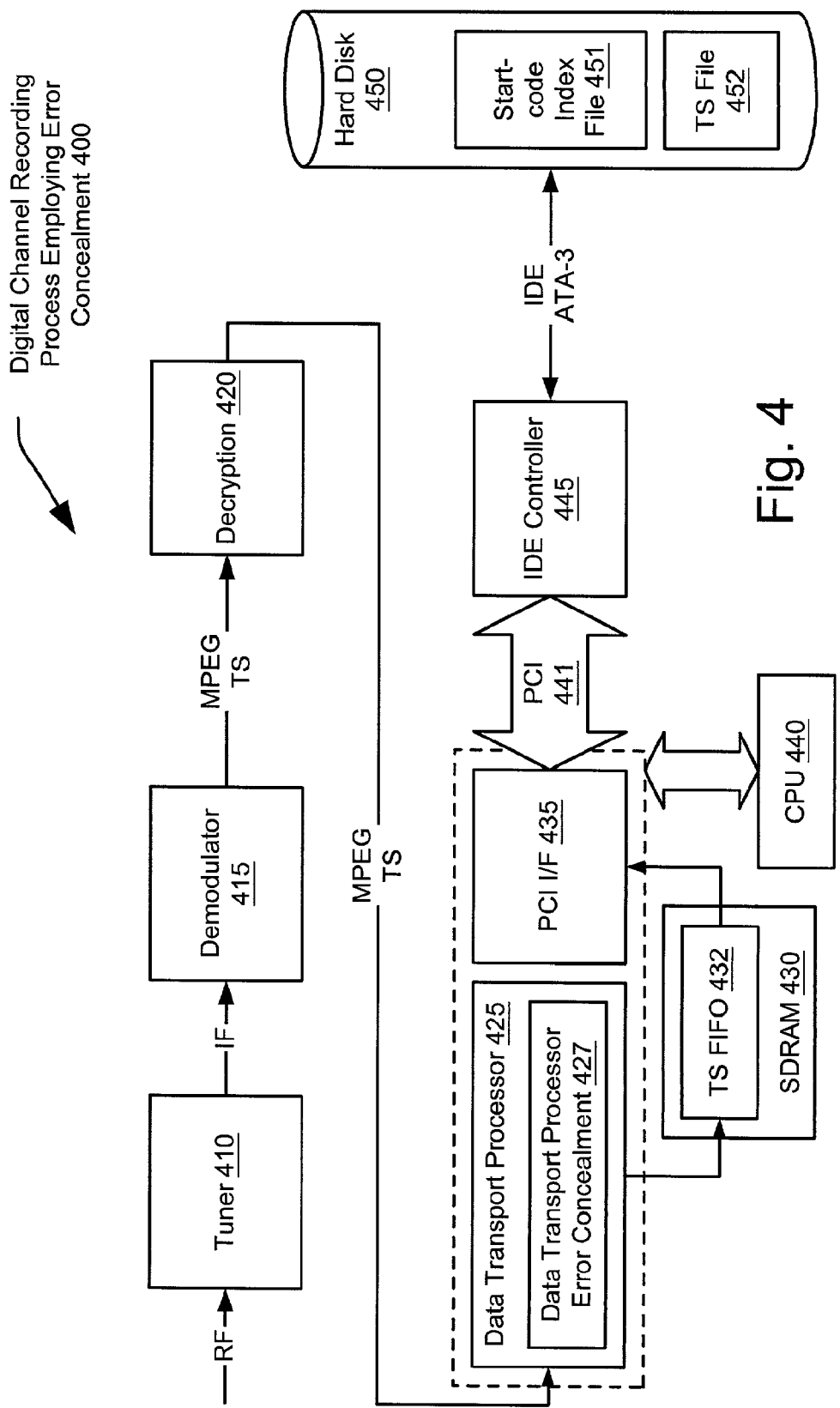
FIG. 4 is a system diagram illustrating an embodiment of a digital channel recording process employing error concealment that is performed in accordance with certain aspects of the present embodiments.

FIG. 4 is a system diagram illustrating an embodiment of a digital channel recording process 400 employing error concealment that is performed in accordance with certain aspects of the present embodiment. The FIG. 4 shows one embodiment where digital channel recording may be performed, in a simplified manner when compared to previous systems, using certain aspects of the present embodiment. In this embodiment, a Personal Video Recorder (PVR) digital-channel-recording process can be described as shown below.

The selected video service will be contained in a Transport Stream (TS) that is received as shown in a Radio Frequency (RF) signal that is received by a tuner 410. The tuner 410 is operable to down-convert the channel that contains the transport stream, from RF to Intermediate Frequency (IF). The Demodulation block, shown as a demodulator 415, demodulates the IF to base-band digital data and outputs the transport stream (shown as an MPEG TS) and sends the data to the decryption block 420.

The decryption block 420 decrypts the packets of the TS into clear data if the service is authorized. This output TS stream goes to the Data Transport Processor 425; this output TS may include some errors. The errors may be generated by any number of means; regardless of how they arrived within the TS, the various aspects of the present embodiment is able to perform error concealment to any errors that may be within the TS. The Data Transport Processor 425 performs data transport error concealment, as shown in the functional block 427, on any errors that may be in the TS that the Data Transport Processor 425 receives from the decryption block 420. The Data Transport Processor 425 then re-multiplexes the TS into a new TS and stores the new TS data in a TS FIFO buffer 432 in Synchronous Dynamic Random Access Memory (SDRAM) 430.

This new TS is then transferred to a hard disk 450. The data within the TS FIFO buffer 432 is operable to be communicated to the hard disk 450. The CPU 440 controls the storing of the data from the TS FIFO 432 to the hard drive (hard disk 450). This is done using Direct Memory Access (DMA) engines that send the data over a PCI bus 441 to a IDE controller chip 445 containing the IDE interface to the hard drive (hard disk 450) itself. If desired, the IDE ATA-3 Advanced Technology Attachment Interface with Extensions—AT Attachment 3 Interface protocol is employed between the IDE controller chip 445 and the hard disk 450. A Start Code Index Table (SCIT) is also generated and stored in the hard disk 450 in a start code index file 451. A TS file 452 is then stored within the hard disk 452. In this embodiment, that performs error concealment within the data transport error concealment functional block 427, any errors within this TS file 452 will be concealed.

The embodiment of FIG. 4 shows how a TS may be generated and stored in a hard disk 450 as will be understood by those persons having skill in the art. When the TS file 452 may then be read from the hard disk 450, there will be no effect of any errors; any errors will have been concealed.

Figure 5:
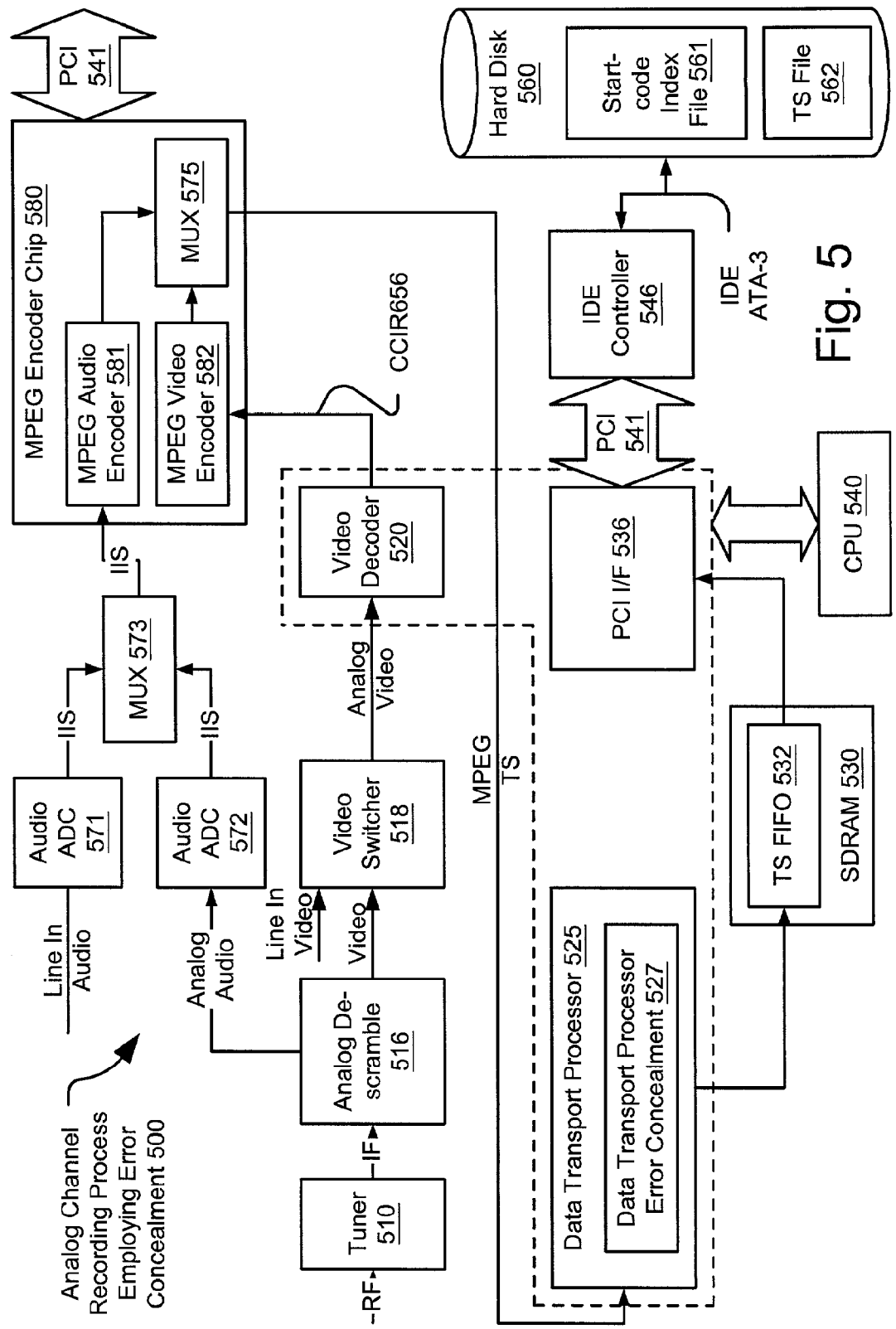
FIG. 5 is a system diagram illustrating an embodiment of an analog channel recording process employing error concealment that is performed in accordance with certain aspects of the present embodiments.

FIG. 5 is a system diagram illustrating an embodiment of an analog channel recording process 500 employing error concealment that is performed. A personal video recorder can accept an analog channel from either the tuner or from the baseband line inputs on the back panel of its device.

The analog channel record path for each of these two cases may be described as shown below. A tuner 510 receives a Radio Frequency (RF) signal and down-converts the selected channel to an Intermediate Frequency (IF) signal. The IF signal is then passed to the analog descramble block 516. The analog descramble block 516 will then demodulate the IF to base-band analog video and audio. If the channel is encrypted, the analog descramble block 516 will also decrypt the signals (provided that it is authorized to do so). The video component from the analog descramble block 516 is passed to a video switcher block 518 from which an analog video signal is passed to a video decoder 520. The video switcher block 518 also receives a line in video signal as well. The analog audio signal, from the analog descramble block 516, is passed to an audio Analog-To-Digital Converter (ADC) 572. Another audio ADC 571 is placed in parallel with the audio ADC 572; the audio ADC 571 receives a line in audio signal. The outputs from both the audio ADCs 571 and 572 are provided as serial I$^2$S data streams and multiplexed (using MUX 573) into a serial I$^2$S data stream that is provided to an MPEG audio encoder block 581 within the MPEG encoder chip 580.

After the video component is then passed to the video decoder 520, the video decoder 520 converts it to an 8 bit parallel data stream that is then sent to an MPEG video encoder block 582 within an MPEG encoder chip 580. The MPEG encoder chip 580 accepts the digitized video (in CCIR656 format, if desired) and digitized audio (from the MUX 573) and compresses them and then multiplexes them (using a MUX 575) to an MPEG TS. The MPEG TS is a MPEG 2 Transport Stream in one particular embodiment. If desired, this now digitized MPEG TS may be communicated to other devices via a PCI bus 541. The MPEG TS is then passed to a Data Transport Processor 525; the MPEG TS may include some undesirable errors. The Data Transport Processor 525 performs data transport error concealment, as shown in the functional block 527, on any errors that may be in the TS that the Data Transport Processor 525 receives from the MPEG encoder chip 580.

The TS processing in the Data Transport Processor 525 stores the data in a TS FIFO buffer 532 in a SDRAM 530; any errors that may have been in the TS received by the Data Transport Processor 525 will be concealed before being stored during the recording process. A CPU 540 controls storing the data from the TS FIFO 532 to the hard drive/hard drive 560. This may be performed using any one or more of various DMA engines that send the data over a PCI bus 541 (after having passed through a PCI I/F 536) to a IDE controller chip 546 containing the IDE interface to the hard drive/hard disk 560 itself. Again, the interfacing between the IDE controller chip 546 and the hard disk 560 may be performed using the IDE ATA-3 protocol. The start code index table (SCIT) is also generated and stored in the hard drive/hard disk 560 in a start code index file 561. Ultimately, a TS file 562 is stored on the hard disk 560. The TS file 562 may then be retrieved for playback or for transmission to other components or devices.

The embodiment of FIG. 5 shows how a TS may be generated and stored in a hard disk 560 as will be understood by those persons having skill in the art. When the TS file 562 may then be read from the hard disk 560, any errors that may have been in the originally received TS will be concealed and will not undesirably affect the reading and performance of them in subsequent components or systems.

Figure 6:
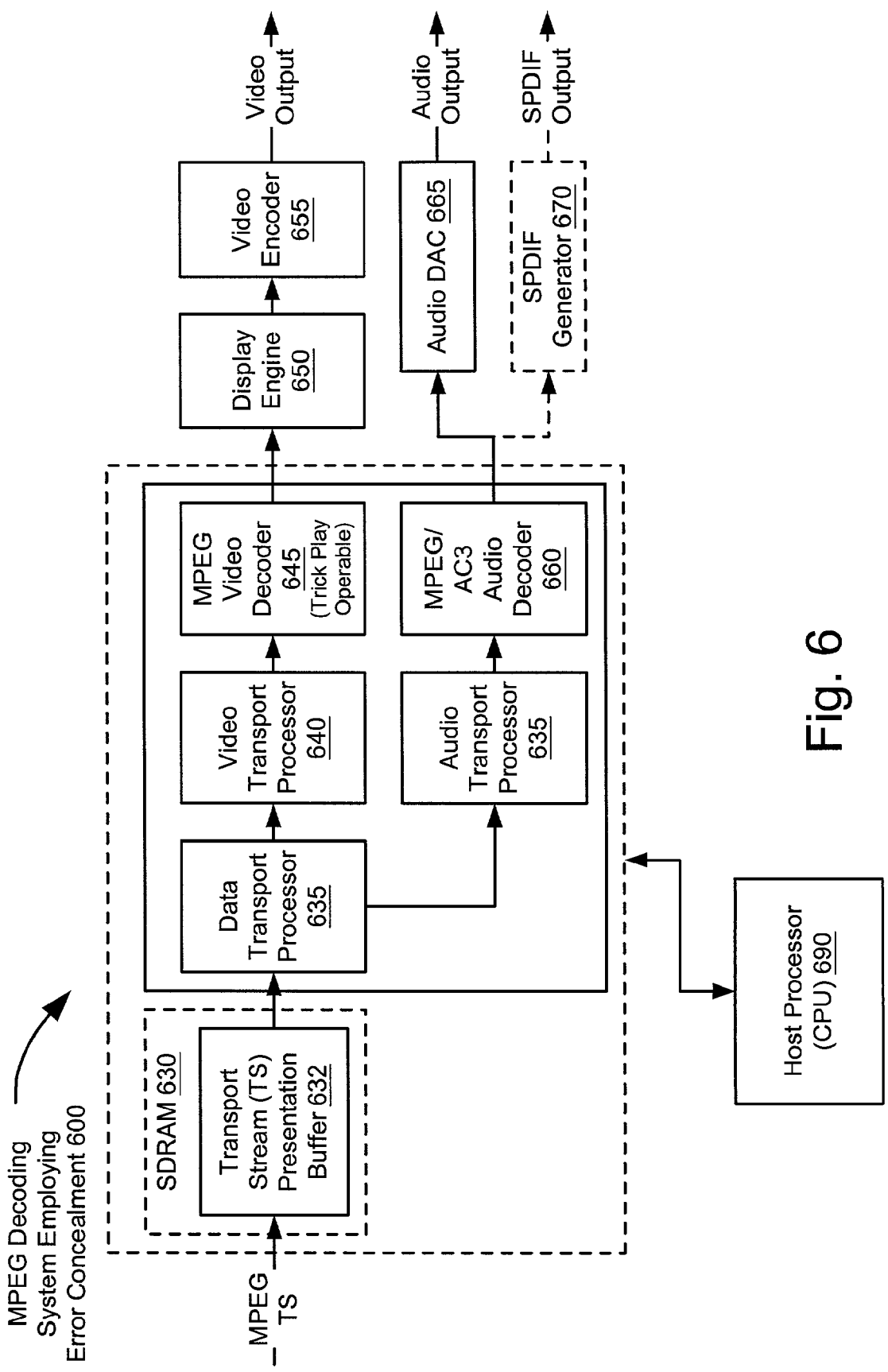
FIG. 6 is a system diagram illustrating an embodiment of an MPEG decoding system employing error concealment in accordance with certain aspects of the present embodiments.

FIG. 6 is a system diagram illustrating an embodiment of an MPEG decoding system 600 employing error concealment. The particular example of MPEG decoding employing error concealment is shown in the FIG. 6, but those persons having skill in the art may appreciate that these aspects of the present embodiment are also extendible to retrieval and playback of other types of data, including audio data and other digital data types. The present embodiment is operable on any MPEG TS; one manner in which an MPEG TS may be received in described below. For example, in one embodiment, a program recorded on a hard drive/hard disk, a personal video recorder, or other operable system is played back that program using the steps described below in the system diagram of the FIG. 6. The present embodiment will help ensure that any error present in the data will be concealed before any playback of an MPEG TS. A processor, that may include a CPU 690, may read a TS data from the hard drive/hard disk based on a user's selected playback mode. The correct MPEG TS data is read into TS presentation buffer 632 within a SDRAM 630 using DMA engines.

Continuing on with an example embodiment of how an MPEG TS may be received, data may be read from the hard drive/hard disk in a similar to the manner in which data is written into a hard drive/hard disk. An IDE controller chip may communicatively couple with the hard disk and perform data transfer using the IDE ATA-3 protocol. The IDE controller chip then communicatively couples to the TS presentation buffer 632 within the SDRAM 630 via a PCI bus and a PCI I/F. The data is output from the TS presentation buffer 632 and is then passed to a data transport processor 635. The data transport processor then de-multiplexes the TS into its PES constituents and passes the audio TS to an audio decoder 660 and the video TS to a video transport processor 640 and then to a MPEG video decoder 645 that is operable to decode the TS; the MPEG video decoder 645 is operable to perform trick play functionality as well. The audio decoder 660 is operable to receive and operate on an audio MPEG Elementary Stream (ES).

The audio data is then sent to the output blocks 665 and 670, and the video is sent to a display engine 650. The display engine 650 is responsible for and operable to perform scaling of the video picture, rendering the graphics, and constructing the complete display among other functions. Once the display is ready to be presented, it is passed to a video encoder 655 where it is converted to analog video using an internal Digital-to-Analog Converter (DAC). The digital audio is converted to analog in the audio Digital-to-Analog Converter (DAC) 665 while a Sony Philips Digital Inter-Face (SPDIF) output stream is also generated and transmitted using a SPDIF generator 670.

The FIG. 6 shows just one embodiment where a digital signal may be retrieved from a hard disk and transformed for playback. Those persons having skill in the art will also appreciate that any number of TS s, contained in memory including within a TS file stored in a hard disk, or any TSs that are present throughout a personal video recorder or a video playback system. An MPEG video decoder, such as the MPEG video decoder 645, that is operable to decode, interpret, and playback the TS. Any errors that may have existed within a received MPEG TS will then be concealed before any subsequent playback.

The present embodiment is operable to employ a timing-recovery circuitry to implement certain embodiments of error concealment. The timing-recovery circuitry is a block of hardware (resided in a data transport processor) designed specifically to manage the absolute and relative time-base for both video and audio during live and playback operations. For example, in one embodiment, the timing-recovery circuitry is a hardware block residing in the MPEG transport processor 210 of the FIG. 2; in another embodiment, the timing-recovery circuitry is a hardware block residing in the MPEG transport processor 310 of the FIG. 3. In yet another embodiment, the timing-recovery circuitry is a hardware block residing in the data transport processor 425 of the FIG. 4; in yet another embodiment, the timing-recovery circuitry is a hardware block residing in the data transport processor 526 of the FIG. 5. Similarly, the timing-recovery circuitry may be a hardware block residing in the data transport processor 635 of the FIG. 6. From one perspective, the function of the timing-recovery circuitry is to monitor timestamps in the MPEG transport stream and update the System Time Clock (STC) in both video and audio when necessary.

Figure 7:
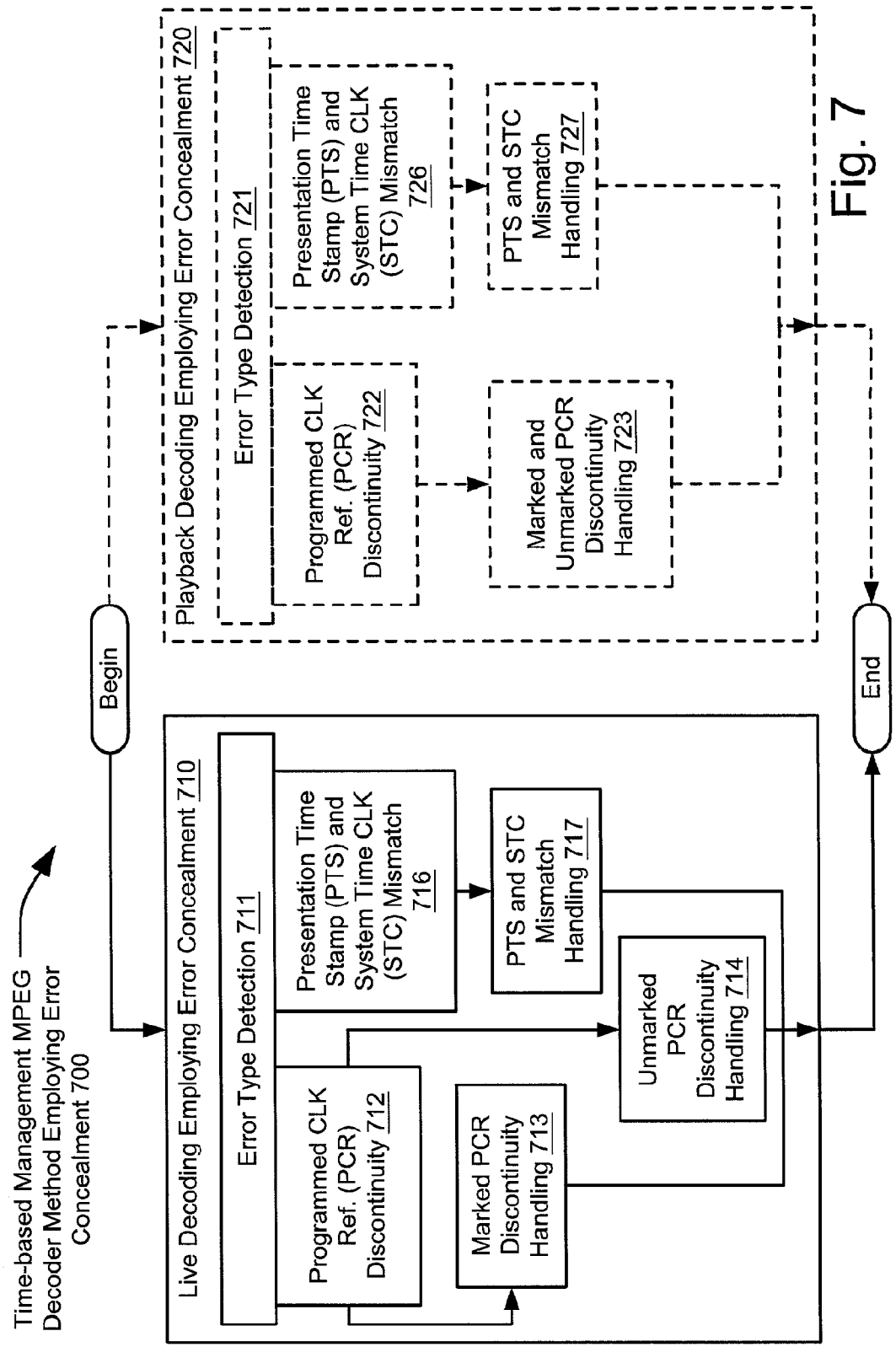
FIG. 7 is an operational flow diagram illustrating an embodiment of a time-based management MPEG decoder method employing error concealment that is performed in accordance with certain aspects of the present embodiments.

FIG. 7 is an operational flow diagram illustrating an embodiment of a time-based management MPEG decoder method 700 employing error concealment. The FIG. 7 illustrates error concealment during live decoding and also during playback decoding.

For example, the embodiment is operable to perform live decoding employing error concealment as shown in a block 710. Within the block 710, the embodiment is operable to detect a type of error within an MPEG TS as shown in a block 711. The subsequent handling the error within the MPEG TS is governed by the type of error within the MPEG TS. For example, if the detected error is a Programmed Clock Reference (PCR) discontinuity as shown in a block 712, then the method is operable to handle this type of error appropriately. The method 700 is able to deal with both marked PCR discontinuities (as shown in a block 713) and unmarked PCR discontinuities (as shown in a block 714). Similarly, if the detected error is a Presentation Time Stamp (PTS) and system time clock (STC) mismatch as shown in a block 716, then the method 700 performs PTS and STC mismatch handling as shown in a block 717.

Similarly, the present embodiment is operable to perform playback decoding employing error concealment as shown in a block 720. Within the block 720, the present embodiment is operable to detect a type of error within an MPEG TS as shown in a block 721. The subsequent handling the error within the MPEG TS is governed by the type of error within the MPEG TS. For example, if the detected error is a Programmed Clock Reference (PCR) discontinuity as shown in a block 722, then the method is operable to handle this type of error appropriately. The method 700 is able to deals with both marked PCR discontinuities and unmarked PCR discontinuities similarly, as shown by a block 723. In addition, if the detected error is a Presentation Time Stamp (PTS) and System Time Clock (STC) mismatch as shown in a block 726, then the method 700 performs PTS and STC mismatch handling as shown in a block 727.

The FIG. 7 illustrates the accommodation of similar types of errors within an MPEG TS and to perform error concealment on them in both live decoding and playback decoding embodiments.

Figure 8:
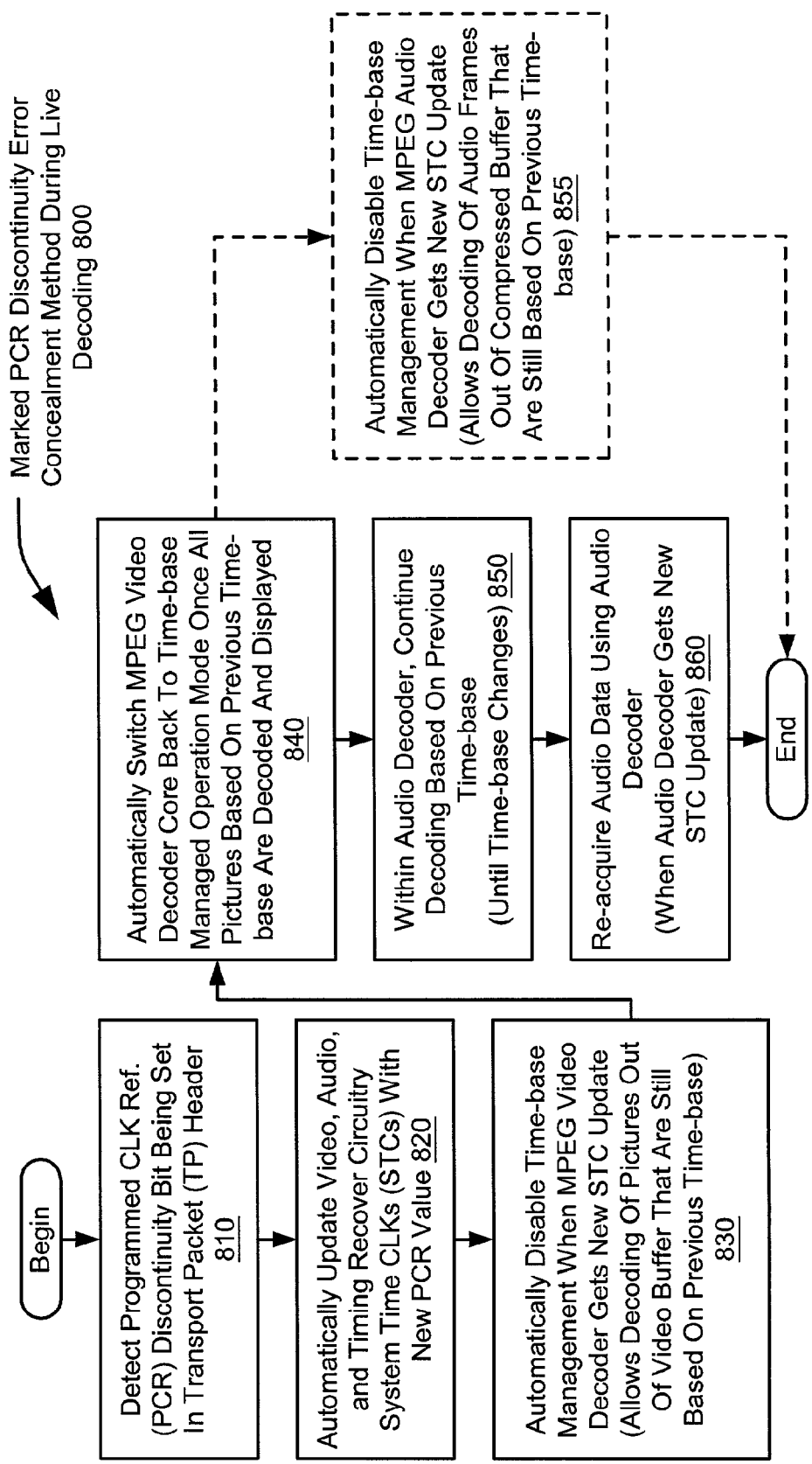
FIG. 8 is an operational flow diagram illustrating an embodiment of a marked Programmed Clock Reference (PCR) discontinuity error concealment method that is performed during live decoding in accordance with certain aspects of the present embodiments.

FIG. 8 is an operational flow diagram illustrating an embodiment of a marked Programmed Clock Reference (PCR) discontinuity error concealment method 800 that is performed during live decoding. If there is a change in the PCR time base of any sort that would require the host processor to reload its System Time Clock (STC) (as opposed to just tracking out the error over time), the MPEG specification requires the transport stream to flag this to the decoder by setting the PCR discontinuity bit in the transport packet header. This PCR discontinuity bit is detected as being set in the transport packet header as shown in a block 810.

The Timing-Recovery Circuitry detects the PCR discontinuity flag in the transport stream. In response to this, the Timing-Recovery Circuitry automatically updates the video, audio, and its own STCs with the new PCR value as shown in a block 820. When the video decoder gets the new STC update, it will automatically disable time-base management to allow pictures to continue to be decoded out of the video buffer that are still based on the previous time-base as shown in a block 830. Once all pictures based on the previous time-base are decoded and displayed, the video decoder core will automatically switch back to time-base managed mode of operation as shown in a block 840.

When the PCR discontinuity is detected, the audio decoder will continue decoding based on the previous time-base, as shown in a block 850, until the time base changes. When the audio decoder gets the new STC update, it will re-acquire the audio data as shown in a block 860. Since the audio decoder core only checks for PTS maturity as data is sent into the audio buffer, the core is able to seamlessly handle this update.

In alternative embodiments, the operations of the blocks 850 and 860 may be replaced with the operation of a block 855. It is possible to run audio decoding in a manner that is very similar to video decoding. For example, an STC update may be used to disable time-base management until all audio frames based on previous time-base are output from a compressed buffer.

Figure 9:
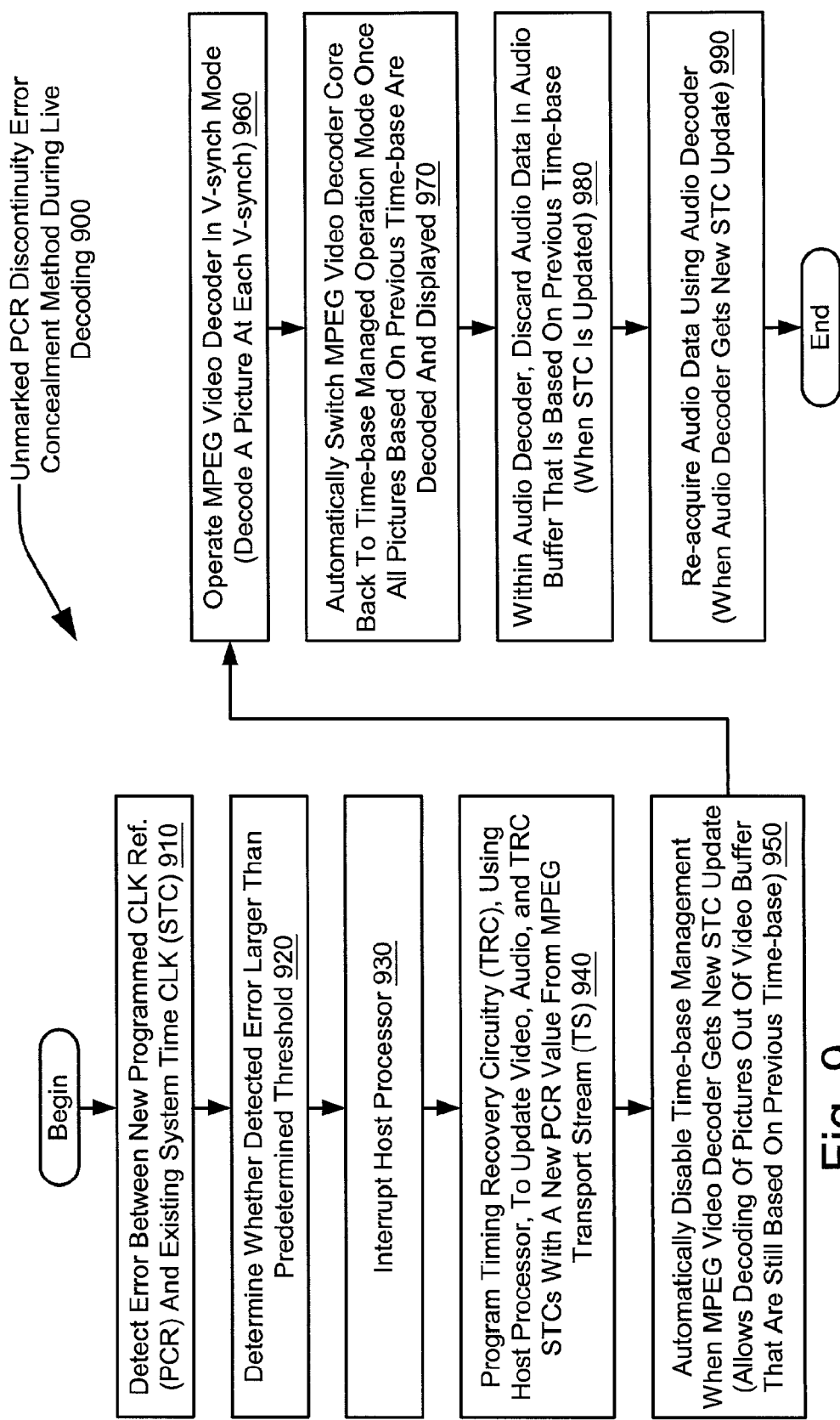
FIG. 9 is an operational flow diagram illustrating an embodiment of an unmarked PCR discontinuity error concealment method that is performed during live decoding in accordance with certain aspects of the present embodiments.

FIG. 9 is an operational flow diagram illustrating an embodiment of an unmarked PCR discontinuity error concealment method 900 that is performed during live decoding. Any unmarked discontinuity in the time-base (i.e. a change in the PCR time-base that is not flagged with the PCR discontinuity bit in the transport header) will be handled as described below.

The Timing-Recovery Circuitry detects that the error between the new PCR and the existing STC as shown in a block 910. Then, in a block 920, it is determined whether the detected error is larger than a predetermined and programmable threshold. If it is, then in response to this, the host processor is interrupted as shown in a block 930. The host processor responses to the PCR error interrupt by programming the Timing-Recovery Circuitry to automatically update the video, audio, and its own STCs with a new PCR value from the MPEG TS as shown in a block 940.

When the MPEG video decoder gets the new STC update, it will automatically disable time-base management to allow pictures to continue to be decoded out of the video buffer that are still based on the previous time-base as shown in a block 950. In this case, the MPEG video decoder is operated in the V-synch mode as shown in a block 960. This operation within the block 960 may be viewed as decoding a picture at each V-synch.

Once all pictures based on the previous time-base are decoded and displayed, the video decoder core will automatically switch back to time-base managed mode of operation as shown in a block 970. When the STC is updated, the audio decoder will discard the data in the audio buffer that are still based on the previous time-base as shown in a block 980. When the audio decoder gets the new STC update, it will re-acquire the audio data as shown in a block 990. Since the audio decoder core only checks for PTS maturity as data is sent into the audio buffer, the core is able to seamlessly handle this update.

Figure 10:
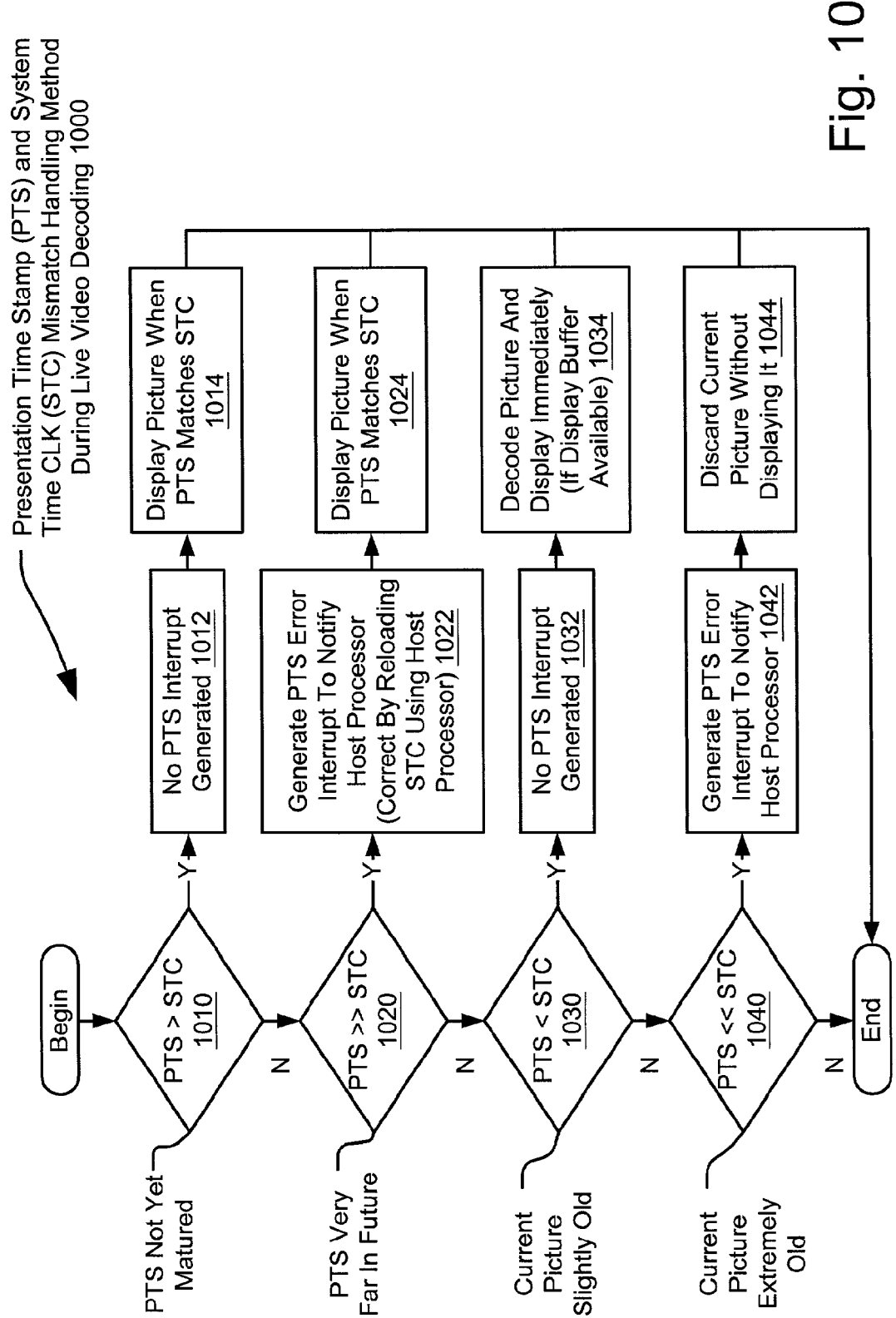
FIG. 10 is an operational flow diagram illustrating an embodiment of a Presentation Time Stamp (PTS) and System Time Clock (STC) mismatch handling method that is performed during live video decoding in accordance with certain aspects of the present embodiments.

FIG. 10 is an operational flow diagram illustrating an embodiment of a Presentation Time Stamp (PTS) and System Time Clock (STC) mismatch handling method 1000 that is performed during live video decoding.

The video decoder is operable to use several thresholds to determine the action preformed when the current PTS does not match the video STC. Each of the scenarios is described as shown below. As shown in a decision block 1010, when it is determined that PTS>STC, then the method deems that the PTS for this picture has not matured. This picture is not displayed until the PTS and STC match. No PTS error interrupt is generated as shown in a block 1012. Then, when the PTS and STC match do in fact match as shown in a block 1014, then the picture is then displayed. A predetermined threshold may be used to determine when PTS>STC.

As shown in a decision block 1020, when it is determined that PTS>>STC, then the method deems that the PTS for this picture is very far in the future. This picture is also not displayed until the PTS and STC match. To allow the host processor to correct this by reloading the STC, a PTS error interrupt is generated to notify the host processor of this situation as shown in a block 1022. Then, when the PTS and STC match do in fact match as shown in a block 1024, then the picture is then displayed. Similarly, a predetermined threshold may be used to determine when PTS>STC, and also the same or another predetermined threshold may be used to determine when PTS>>STC. These one or two predetermined threshold(s) may be used to distinguish between the two conditions; it is understood that more than one predetermined threshold may be used to distinguish the two conditions from one another.

As shown in a decision block 1030, when it is determined that PTS<STC, then the method deems that the current picture is slightly old. No PTS error interrupt is generated as shown in a block 1032. The picture is decoded and, if a display buffer is available at that point in time, displayed immediately as shown in a block 1034. A predetermined threshold may be used to determine when PTS<STC.

As shown in a decision block 1030, when it is determined that PTS<<STC, then the method deems that the current picture is extremely old. In this situation, a PTS error interrupt is generated to notify the host processor of this situation as shown in a block 1042. The current picture is discarded without being displayed as shown in a block 1044. Similarly, a predetermined threshold may be used to determine when PTS<STC, and also the same or another predetermined threshold may be used to determine when PTS<<STC. These one or two predetermined threshold(s) may be used to distinguish between the two conditions; it is understood that more than one predetermined threshold may be used to distinguish the two conditions from one another.

The predetermined thresholds for determining the four conditions may or may not be symmetric. That is to say, the predetermined threshold for the PTS>STC situation may be different, in absolute value terms, than the predetermined threshold for the PTS<STC situation. Similarly, the predetermined threshold for the PTS>>STC situation may be different, in absolute value terms, than the predetermined threshold for the PTS<<STC situation.

Figure 11:
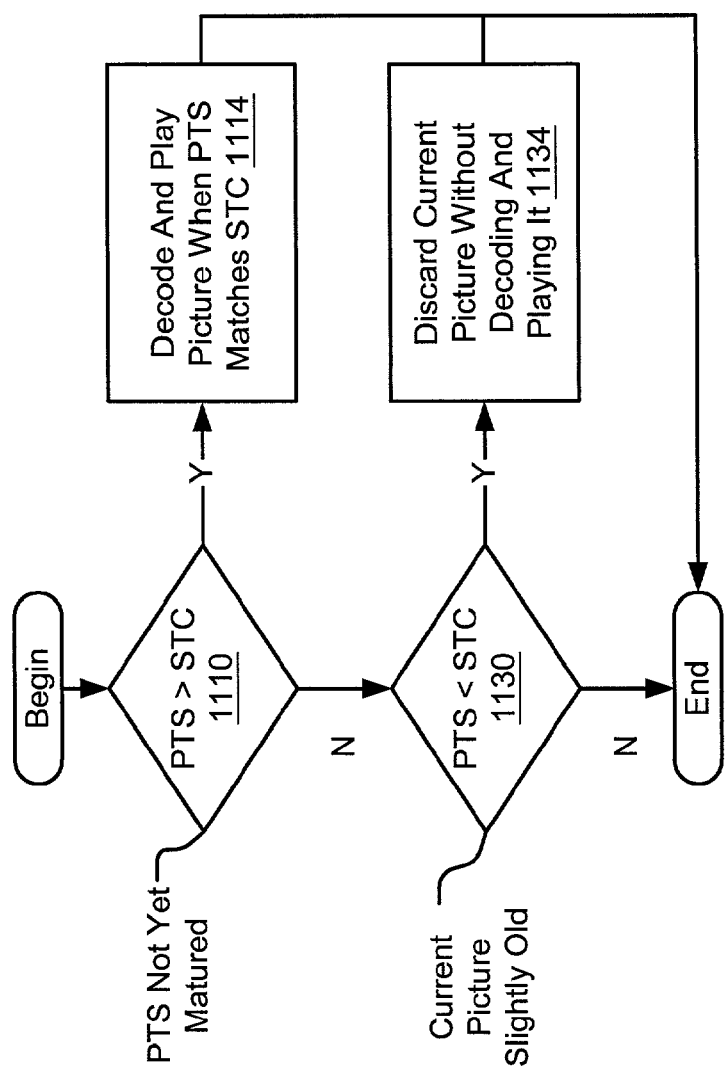
FIG. 11 is an operational flow diagram illustrating an embodiment of a PTS and STC mismatch handling method that is performed during live audio decoding in accordance with certain aspects of the present embodiments.

FIG. 11 is an operational flow diagram illustrating an embodiment of a PTS and STC mismatch handling method 1100 that is performed during live audio decoding. The audio decoder determines its actions as described below.

As shown in a decision block 1110, when it is determined that PTS>STC, then the method deems that the PTS for this frame has not matured. This picture is not decoded and played until the PTS and STC match. As shown in a block 1114, when the PTS and STC match do in fact match, then the picture is decoded and played.

As shown in a decision block 1130, when it is determined that PTS<STC, then the method deems that the current frame is old. This picture is discarded without being decoded and played. As shown in a block 1134, the current picture is discarded without being decoded and played.

The present embodiment considers situations when a program may be watched and recorded simultaneously. Just as in live decode embodiments, certain aspects support unmarked discontinuities in the time-base during playback. Instead of relying on the Timing-Recovery Circuitry to detect time-base jumps in the PCRs as is done during live decode, the video decompression engine is configured during playback to interrupt the host processor every time a PTS/DTS (DTS=Decoding time stamp) to STC difference is larger than a predetermined or programmed amount. If this interrupt is detected, then the host processor reads the last PTS seen by video, and the host processor uses that value to force the Timing-Recovery Circuitry to synchronously update all STCs, thereby ensuring a smooth time-base transition.

Figure 12:
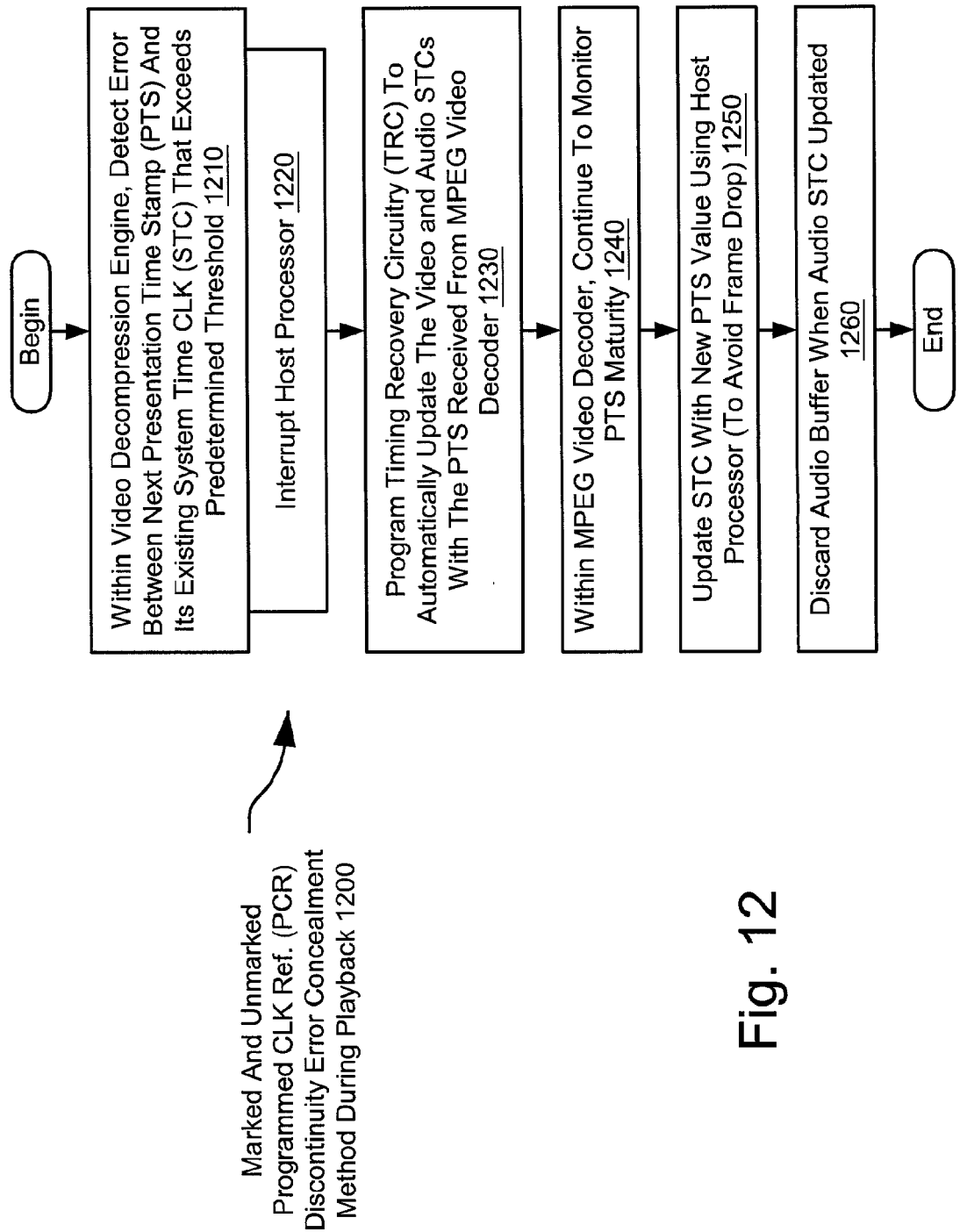
FIG. 12 is an operational flow diagram illustrating an embodiment of a marked and unmarked PCR discontinuity error concealment method that is performed during playback in accordance with certain aspects of the present embodiments.

FIG. 12 is an operational flow diagram illustrating an embodiment of a marked and unmarked PCR discontinuity error concealment method 1200 that is performed during playback. Within the video decompression engine, the video decompression engine waits for an error to be detected between the next PTS and its existing STC that exceeds a predetermined or programmable threshold as shown in a block 1210. When this error is in fact detected, the host processor is interrupted as shown in a block 1220.

As shown in a block 1230, the host processor responds to the PTS error interrupt by programming the Timing-Recovery Circuitry to automatically updated the video and audio STCs with the PTS it received from the video decoder. This allows the updating of the audio and video STC values. In contradistinction to the live broadcast model, when the discontinuity is noticed in the PCR, in this case the discontinuity is noticed in the PTS/DTS. For this reason, the video decoder will never automatically disable time-base management. The video decoder will continue to monitor for PTS maturity before anything is decoded as shown in a block 1240. It is up to the host processor to update the STC with the new PTS value in a timely fashion to avoid a frame drop during this period as shown in a block 1250. This functionality serves at least two purposes: it avoids any issues with respect to dealing with any stream dependent STC to PTS offsets, and it keeps any possible frame drop/repeat synchronous with the time-base discontinuity (and thus probably synchronous with any scene change). Since the audio decoder engine only checks for PTS maturity as data is sent into the audio buffer, this engine is able to seamlessly handle this update. Also, when the audio STC is updated, the audio decoder engine discards the audio buffer as shown in a block 1260.

The video decoder uses several thresholds to determine the action preformed when the current PTS does not match the video STC. These scenarios slightly differ between the playback and live decode situations with regards to the video decoder dropping playback data. Each of the scenarios is more detail described below.

Figure 13:
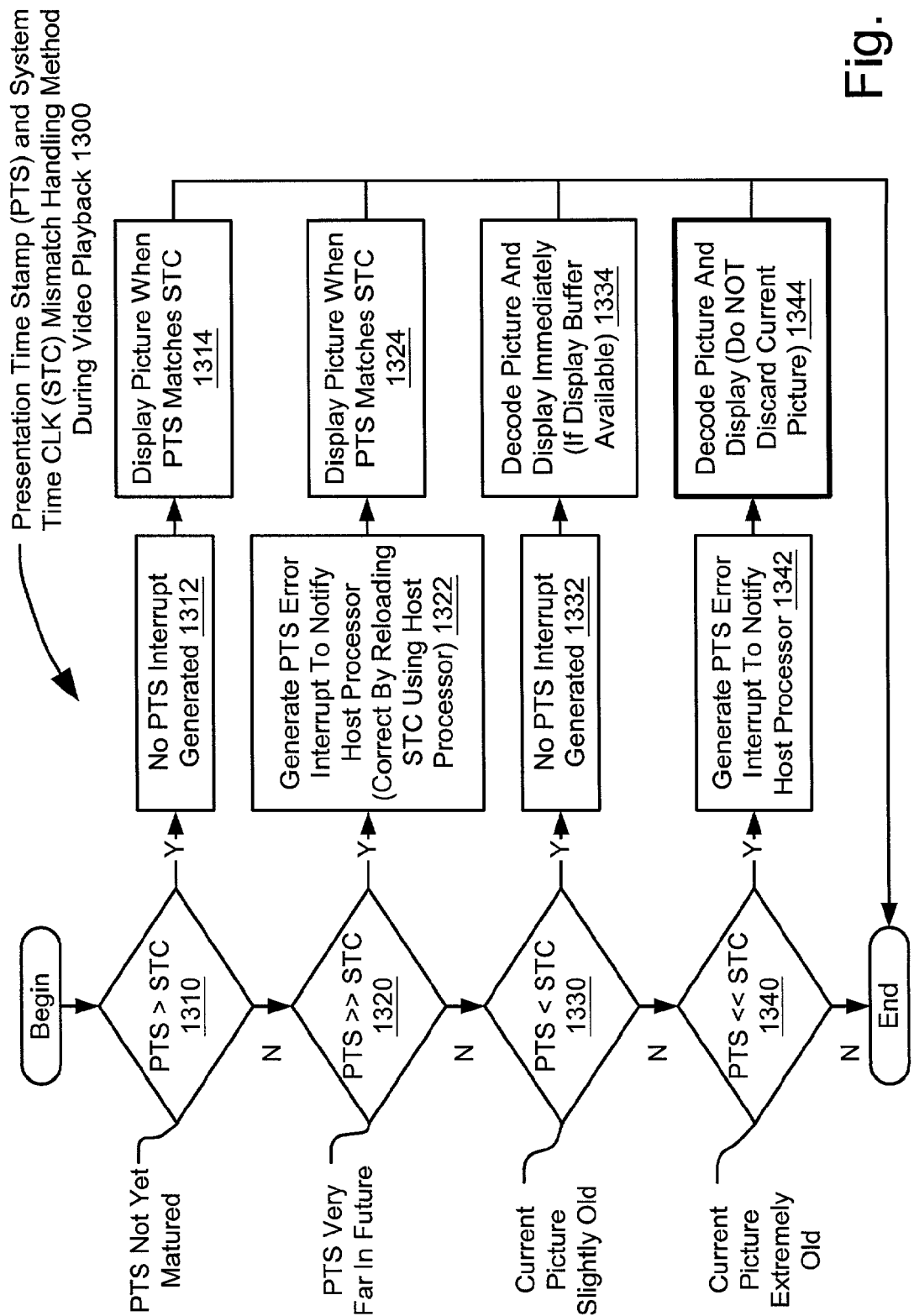
FIG. 13 is an operational flow diagram illustrating an embodiment of a PTS and STC mismatch handling method that is performed during video playback in accordance with certain aspects of the present embodiments.

FIG. 13 is an operational flow diagram illustrating an embodiment of a PTS and STC mismatch handling method 1300 that is performed during video playback.

As shown in a decision block 1310, when it is determined that PTS>STC, then the method deems that the PTS for this picture has not matured. This picture is not displayed until the PTS and STC match. No PTS error interrupt is generated as shown in a block 1312. Then, as shown in a block 1314, when the PTS and STC match do in fact match, then the picture is then displayed. A predetermined threshold may be used to determine when PTS>STC.

As shown in a decision block 1320, when it is determined that PTS>>STC, then the method deems that the PTS for this picture is very far in the future. This picture is not displayed until the PTS and STC match. To allow the host processor to correct this by reloading the STC, a PTS error interrupt is generated to notify the host processor of this situation as shown in a block 1322. Then, when the PTS and STC match do in fact match as shown in a block 1324, then the picture is then displayed. Similarly, a predetermined threshold may be used to determine when PTS>STC, and also the same or another predetermined threshold may be used to determine when PTS>>STC. These one or two predetermined threshold(s) may be used to distinguish between the two conditions; it is understood that more than one predetermined threshold may be used to distinguish the two conditions from one another.

As shown in a decision block 1330, when it is determined that PTS<STC, then the method deems that the current picture is slightly old. The picture is decoded and, if a display buffer is available at that point in time, displayed immediately. No PTS error interrupt is generated as shown in a block 1332. The picture is decoded and, if a display buffer is available at that point in time, displayed immediately as shown in a block 1334. A predetermined threshold may be used to determine when PTS<STC.

As shown in a decision block 1340, when it is determined that PTS<<STC, then the method deems that the current picture is extremely old. In this situation, a PTS error interrupt is generated to notify the host processor of this situation as shown in a block 1342. The current picture is in then DISPLAYED as shown in a block 1344. As opposed to live decode, data is NOT dropped in this scenario. Similarly, a predetermined threshold may be used to determine when PTS<STC, and also the same or another predetermined threshold may be used to determine when PTS<<STC. These one or two predetermined threshold(s) may be used to distinguish between the two conditions; it is understood that more than one predetermined threshold may be used to distinguish the two conditions from one another.

Figure 14:
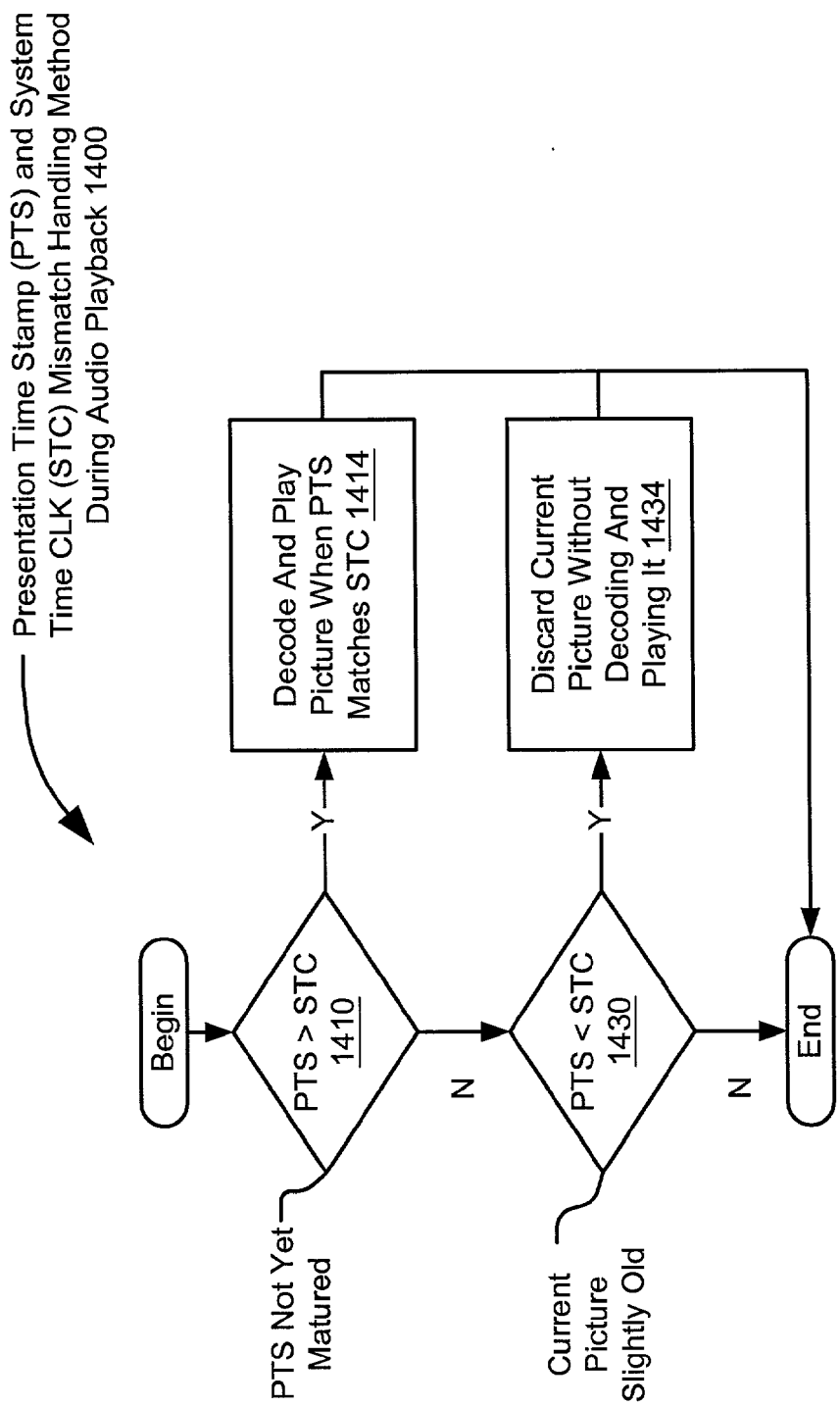
FIG. 14 is an operational flow diagram illustrating an embodiment of a PTS and STC mismatch handling method that is performed during audio playback in accordance with certain aspects of the present embodiments.

FIG. 14 is an operational flow diagram illustrating an embodiment of a PTS and STC mismatch handling method 1400 that is performed during audio playback. The audio decoder determines its actions as described below.

As shown in a decision block 1410, when it is determined that PTS>STC, then the method deems that the PTS for this frame has not matured. This picture is not decoded and played until the PTS and STC match. As shown in a block 1414, when the PTS and STC match do in fact match, then the picture is decoded and played.

As shown in a decision block 1430, when it is determined that PTS<STC, then the method deems that the current frame is old. This picture is discarded without being decoded and played. As shown in a block 1434, the current picture is discarded without being decoded and played.

Just as in live decode embodiments, certain aspects support unmarked discontinuities in the time-base during playback. Instead of relying on the Timing-Recovery Circuitry to detect time-base jumps in the PCRs as is done during live decode, the video decompression engine is configured during playback to interrupt the host processor every time a PTS/DTS to STC difference is larger than a predetermined or programmed amount. If this interrupt is detected, then the host processor reads the last PTS seen by video, and the host processor uses that value to force the Timing-Recovery Circuitry to synchronously update all STCs, thereby ensuring a smooth time-base transition.

Figure 15:
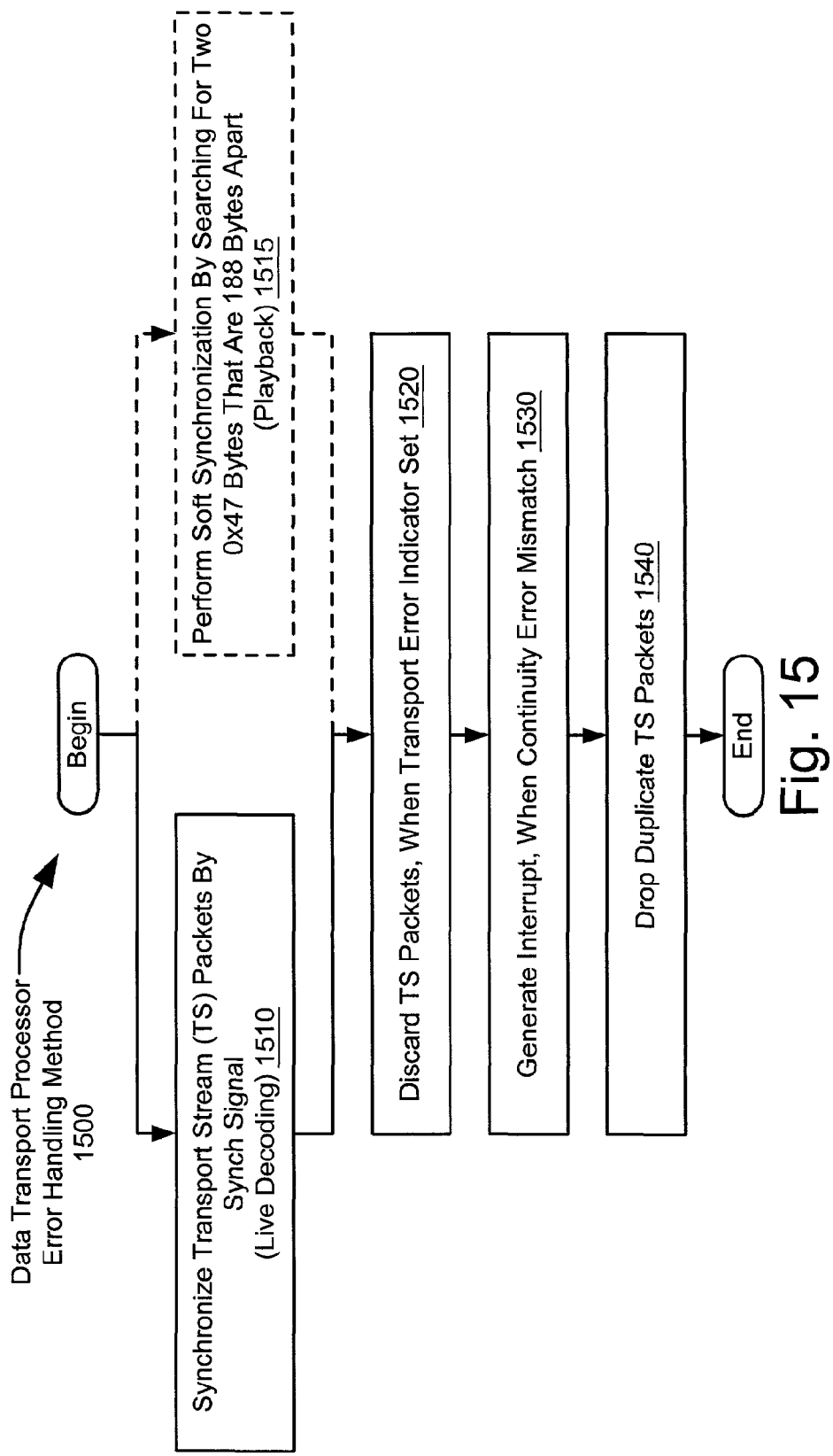
FIG. 15 is an operational flow diagram illustrating an embodiment of a data transport processor error handling method that is performed in accordance with certain aspects of the present embodiments.

FIG. 15 is an operational flow diagram illustrating an embodiment of a data transport processor error handling method 1500. A data transport processor is operable to perform some basic error-concealment functions as described below.

For the live decoding situation, TS packets are synchronized by the SYNCH signal (a synchronization signal) as shown in a block 1510. Alternatively, for the playback situation, soft synchronization is performed by searching for two 0x47 bytes that are 188 bytes apart as shown in a block 1515. Then, regardless of whether the implementation is the live decoding situation or the playback situation, the TS packet is discarded when the transport error indicator is set as shown in a block 1520. Then, as shown in a block 1530, when there is a continuity counter mismatch, an interrupt is generated to inform the host processor. Finally, as shown in a block 1540, duplicated packets can be dropped.

Figure 16:
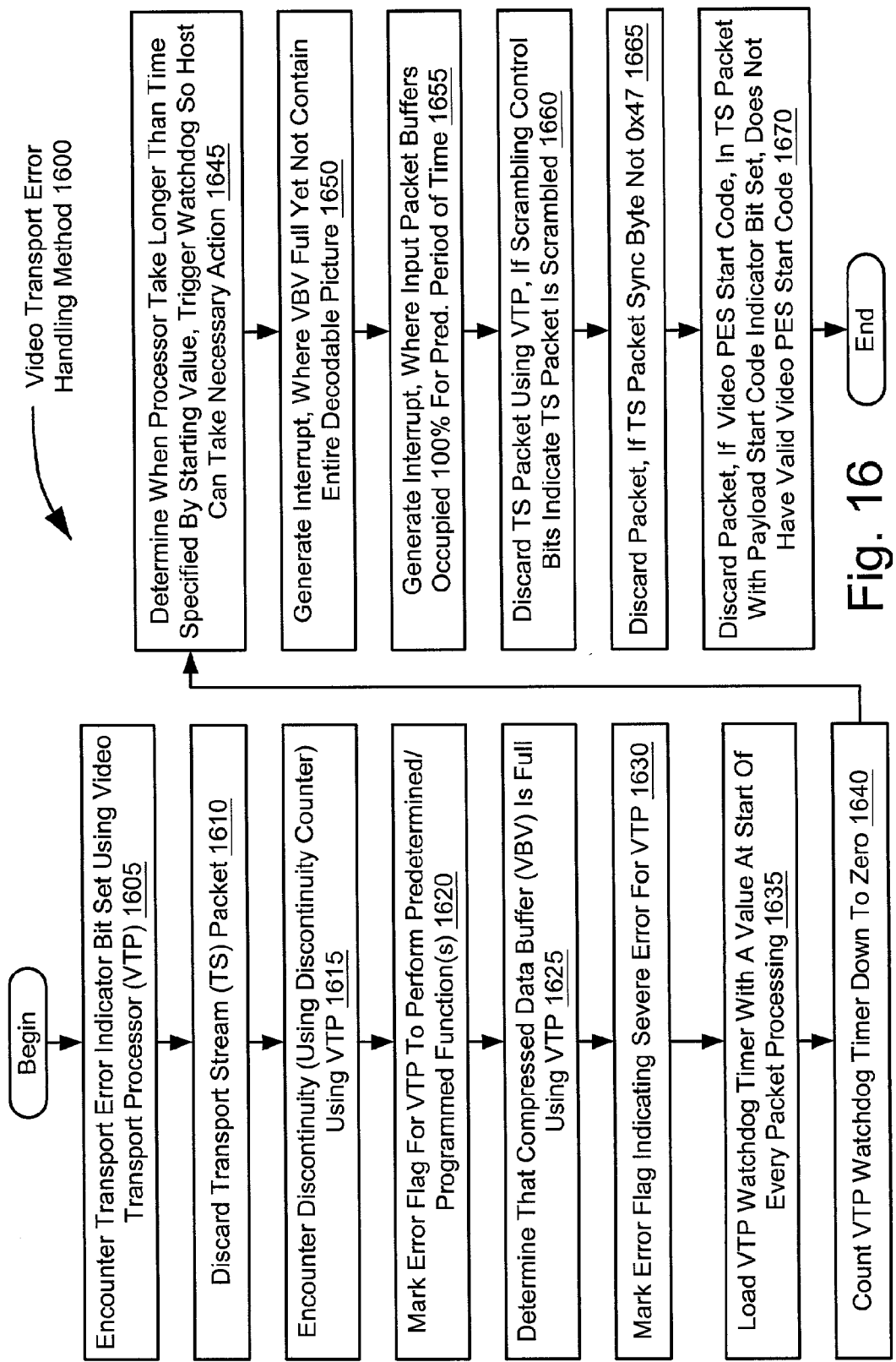
FIG. 16 is an operational flow diagram illustrating an embodiment of a video transport error handling method that is performed in accordance with certain aspects of the present embodiments.

FIG. 16 is an operational flow diagram illustrating an embodiment of a video transport error handling method 1600. The operations of the video transport processor that perform the following error-concealment functions may be described below. When the Video Transport decoder encounters the Transport Error Indicator bit set as shown in a block 1605, then it discards that packet as shown in a block 1610. When the Transport decoder encounters a discontinuity in the Continuity counter as shown in a block 1615, then as shown in a block 1620, it marks the Error flag for the Video decoder to take possible actions (these actions are programmable).

As shown in a block 1625, the Transport decoder determines whether the compressed data buffer (VBV) has become full and whether there is no place in the buffer. When the Transport decoder does in fact encounter a scenario that the compressed data buffer (VBV) has become full and there is no place in the buffer, then it marks the Error Flag indicating severe Error to the Video Decoder as shown in a block 1630. The Video Transport Processor watchdog Timer is loaded with a value at the start of every packet processing as shown in a block 1635. This value is allowed to down count to zero as shown in a block 1640.

The processor determines whether it takes more than the time specified by the value to process the packet. If the processor does in fact take more than the time specified by the value to process the packet, the watchdog triggers and the host can take necessary action as shown in a block 1645.

The Video Transport Processor generates an error interrupt to the host processor if it encounters a scenario, where the VBV is full as shown in a block 1650, but does not contain even one entire decodable picture. The error interrupt is also generated when it's input packet buffers are having a 100% occupancy for extended periods continuously as shown in a block 1655. If the Scrambling control bits indicate that the packet is scrambled, the Video Transport processor discards that packet as shown in a block 1660. If the Sync byte of a transport packet is not 0x47, that packet is discarded as shown in a block 1665. If the Video PES start code in a transport packet indicates that it has a set payload_start_code_indicator, and if it is not a Valid Video PES start code (0x000001Ex), then that packet is discarded as shown in a block 1670.

Figure 17:
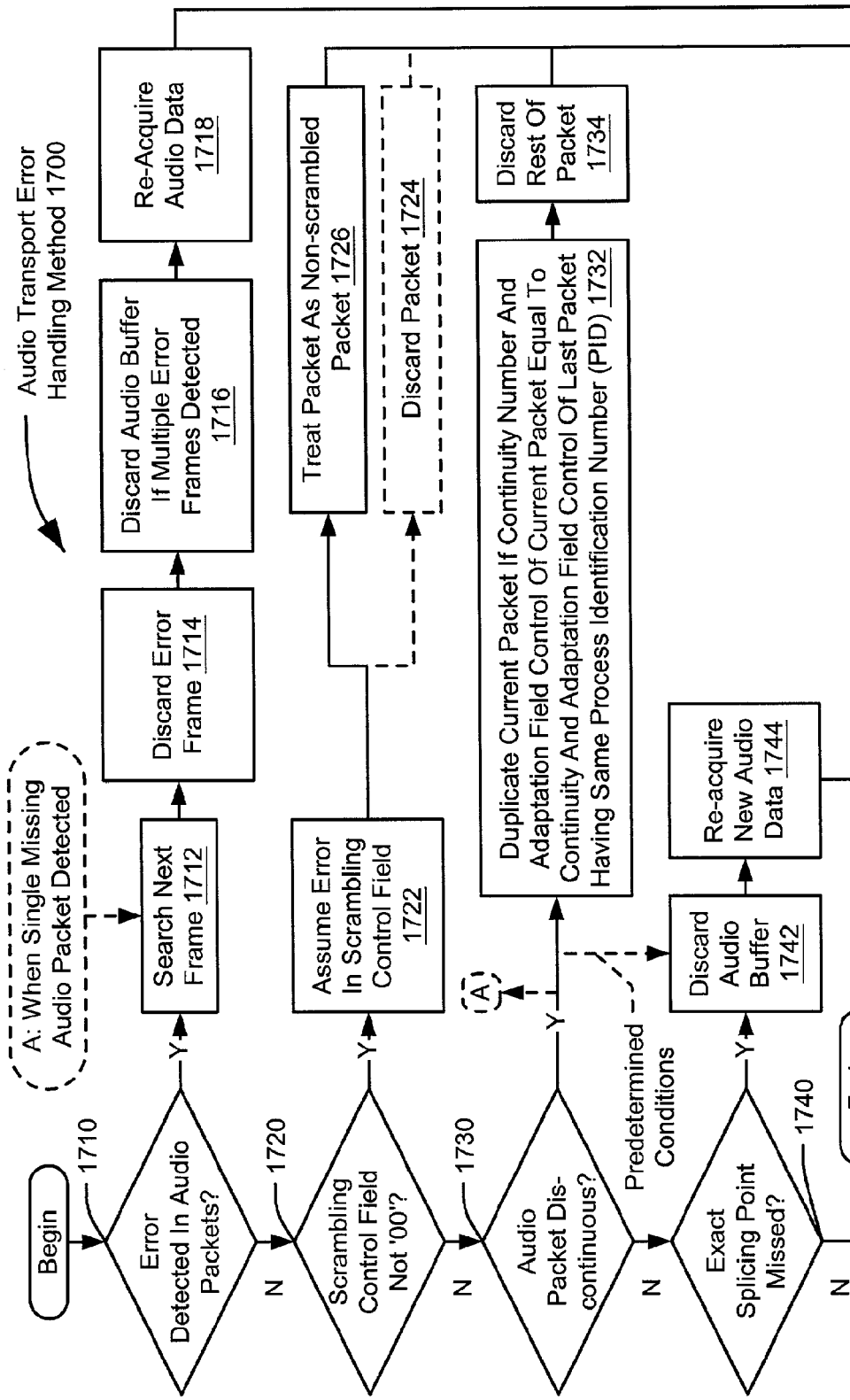
FIG. 17 is an operational flow diagram illustrating an embodiment of an audio transport error handling method that is performed in accordance with certain aspects of the present embodiments.

FIG. 17 is an operational flow diagram illustrating an embodiment of an audio transport error handling method 1700. There are four cases of errors during an audio TS packet. They are when errors are detected in audio packets, when the Scrambling_control field is not "00" in a non-duplicate and non-reserved audio packet containing payload, when the audio packet is discontinuous, and when the exact splicing point was missed. The handling of the above four error conditions is explained below.

As shown in a decision block 1710, when it is determined that errors are detected in audio packets, then the following operations are performed. When the audio transport detects packet errors in an audio frame, it will search for the next frame, as shown in a block 1712, and discard the error frame as shown in a block 1714. If more than one error frames are detected, the audio transport will discard the audio buffer as shown in a block 1716. Then, in a block 1718, the new audio data are re-acquired.

As shown in a decision block 1720, when it is determined that the scrambling_control field is not "00" in a non-duplicate and non-reserved audio packet containing payload, then the following operations are performed. An error is assumed if the scrambling_control field in a non-duplicate or non-reserved audio packet containing a payload is not set to '00' as shown in a block 1722; this means that the audio data is still encrypted. There are one of two options that may be performs from here. In one situation, the packet may be discarded as shown in a block 1724. Alternatively, as shown in a block 1726, the packet may be treated as a non-scrambled packet depending on how the chip operating the method is actually programmed.

As shown in a decision block 1730, when it is determined that the audio packet is discontinuous, then the following operations are performed. The continuity count field is used for dropped or duplicate packet detection. After reset, a channel change, or splicing, the first auto packet's continuity is not compared to the continuity value of any previous packet. In the following audio packets, if the continuity number and adaptation_field_control of the current packet is equal to the continuity and adaptation_field_control of the last packet having the same PID, then the current packet is duplicated as shown in a block 1732. The rest of the packet is discarded as shown in a block 1734. In even alternative embodiments, when it is determined that the audio packet is discontinuous, then the audio transport error handling method 1700 may jump to the functional block 1712 (search next frame) and continue on with the operations of the audio transport error handling method 1700 from that point when a single missing audio packet has been detected. That is to say, the discontinuity here is a special case when the discontinuity involves a single missing audio packet.

The following may be referred to in the FIG. 17 as "pre-determined condition" extending from the decision block 1730: if the continuity of the current packet is greater than 1 more than the continuity of the previous packet with the same PID, or if the continuity of the current packet having payload is equal to the continuity of the previous packet having an adaptation control field of "00" or "10", or if a packet having adaptation and payload has a continuity value equal to the previous audio packet which had payload only, or if a packet having payload only has a continuity value equal to the previous audio packet which had adaptation and payload, discontinuity is detected. Upon detecting a discontinuous packet, the audio transport will discard the audio buffer, as shown in a block 1742, and re-acquire the new audio data as shown in a block 1744.

As shown in a decision block 1740, when it is determined that the exact splicing point was missed, then the following operations are performed. An error condition exists when splicing occurs after the intended splicing point. The audio transport will discard the audio buffer, as shown in a block 1742, and re-acquire the new audio data as shown in a block 1744.

Figure 18:
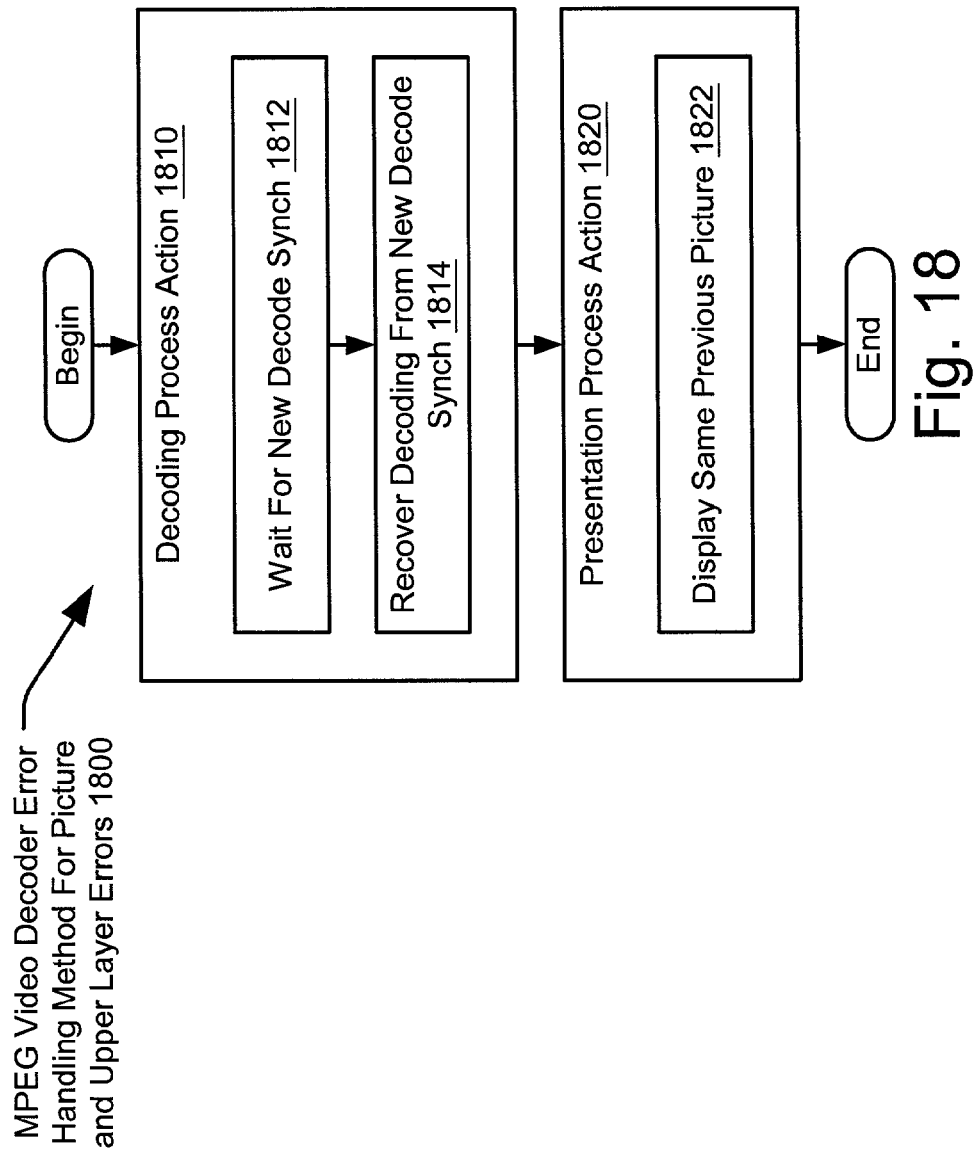
FIG. 18 is an operational flow diagram illustrating an embodiment of an MPEG video decoder error handling method, for picture and upper layer errors, that is performed in accordance with certain aspects of the present embodiments.

FIG. 18 is an operational flow diagram illustrating an embodiment of an MPEG video decoder error handling method 1800, for picture and upper layer errors. In general, error concealment is achieved by performing video holds. The operations for the picture and upper layers' error are shown in the FIG. 18. The decoding process action is shown in a block 1810. As shown in a block 1812, the method waits for the new decode synch. Then, in a block 1814, the method recovers the decoding from the new decode synch. The presentation process action is shown in a block 1820. The same previous picture is displayed as shown in a block 1822.

Figure 19:
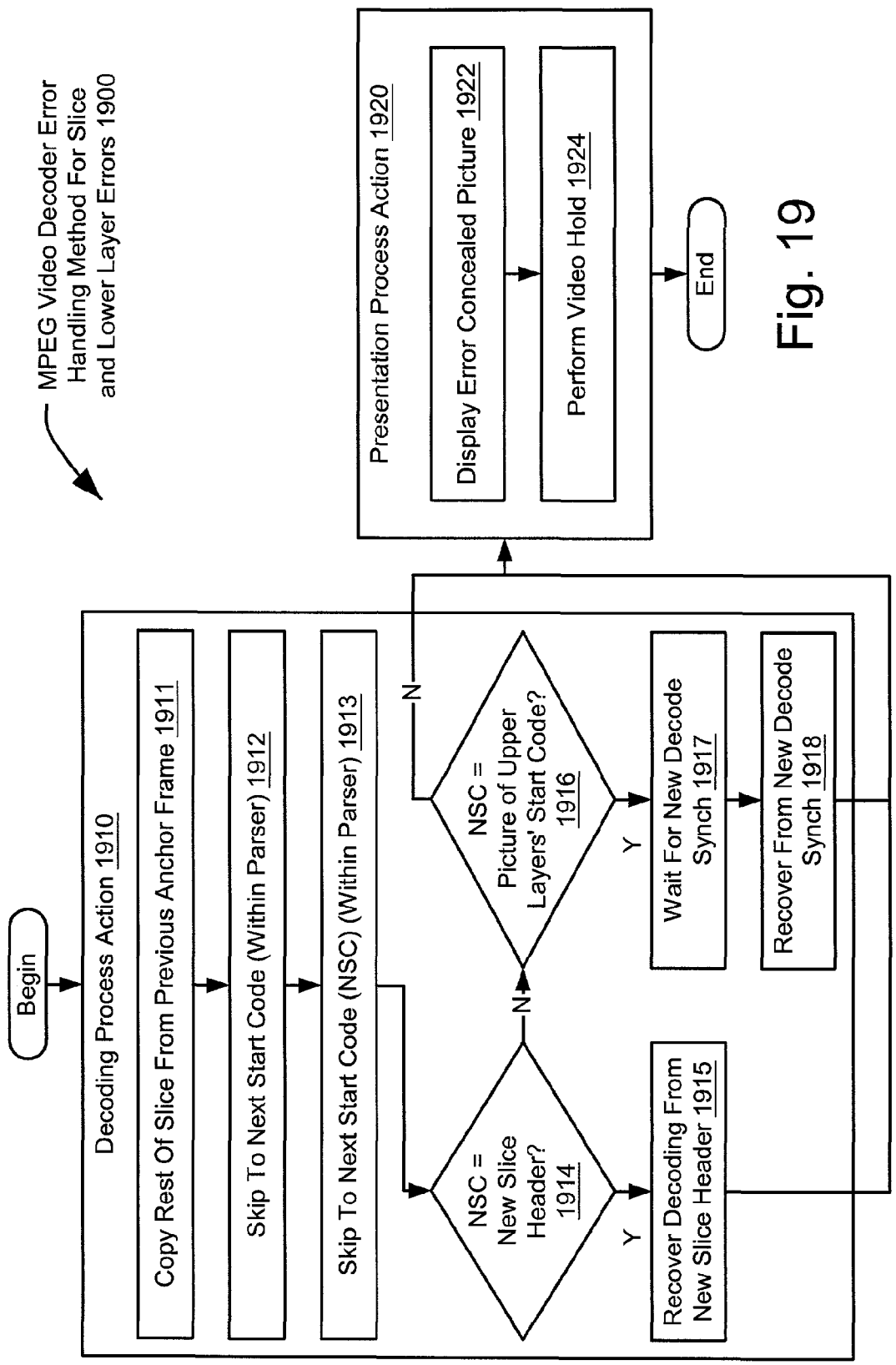
FIG. 19 is an operational flow diagram illustrating an embodiment of an MPEG video decoder error handling method, for slice and lower layer errors, that is performed in accordance with certain aspects of the present embodiments.

FIG. 19 is an operational flow diagram illustrating an embodiment of an MPEG video decoder error handling method 1900, for slice and lower layer errors. The handling of the slice and lower layers' error are described below.

The decoding process action is shown in a block 1910. In a block 1911, the rest of the slice from the previous anchor frame is copied. Within the parser, the method skips to the next start code as shown in a block 1912. If it is determined that the next start code is a new slice header as shown in a decision block 1914, then the decoding process action recovers from there as shown in a block 1915.

However, if it is determined that the next start code is not a new slice header as shown in the decision block 1914, then it is further determined whether the next start code is a picture or upper layers' start code as shown in a decision block 1916. If it is determined that the next start code is in fact a picture or upper layers' start code as shown in the decision block 1916, then the method then waits for the new decode synch, as shown in a block 1917, and the method recovers the decoding process action from there as shown in a block 1918. If it is determined that the next start code is not a picture or upper layers' start code as shown in the decision block 1916, then the method then proceeds to the presentation process action that is shown in a block 1920.

Again, the presentation process action is shown in a block 1920. The presentation process action involves displaying the concealed picture as shown in a block 1922. The presentation process action also involves performing "video hold" as shown in a block 1924.

Figure 20:
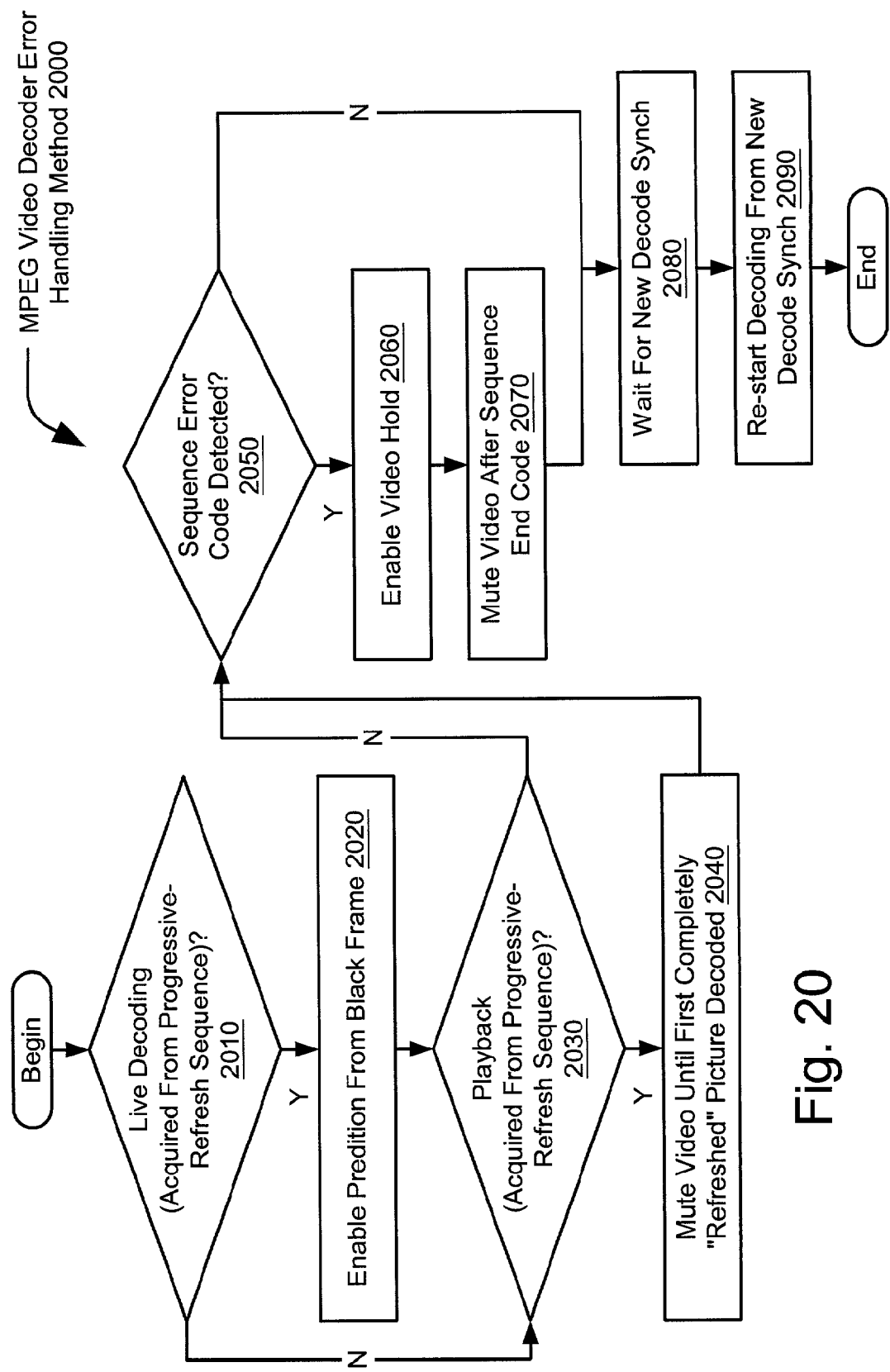
FIG. 20 is an operational flow diagram illustrating an embodiment of an MPEG video decoder error handling method that is performed in accordance with certain aspects of the present embodiments.

FIG. 20 is an operational flow diagram illustrating an embodiment of an MPEG video decoder error handling method 2000. If it is determined that live decoding is being performed as shown in a decision block 2010, specifically when acquired from a progressive-refresh sequence, then a prediction made from a black frame will be enabled as shown in a block 2020. If it is determined that live decoding is not being performed as shown in the decision block 2010, then the method continues on to a decision block 2030.

For playback, when the data is determined to be acquired from a progressive-refresh sequence as shown in a decision block 2030, then the video can be muted until the first completely "refreshed" picture is decoded as shown in a block 2040. Then the method continues on to the decision block 2050. Alternatively, when the data is determined not to be acquired from a progressive-refresh sequence as shown in the decision block 2030, then the method continues on to the decision block 2050.

Then, in a decision block 2050, when a sequence_error_code is detected, then a "video hold" will be enabled as shown in a block 2060. Afterwards, the video is muted after a sequence_end_code as shown in a block 2070. In both cases, decoding process will wait for the new decode synch, as shown in a block 2080, and the method then re-starts from there as shown in a block 2090.

Figure 21:
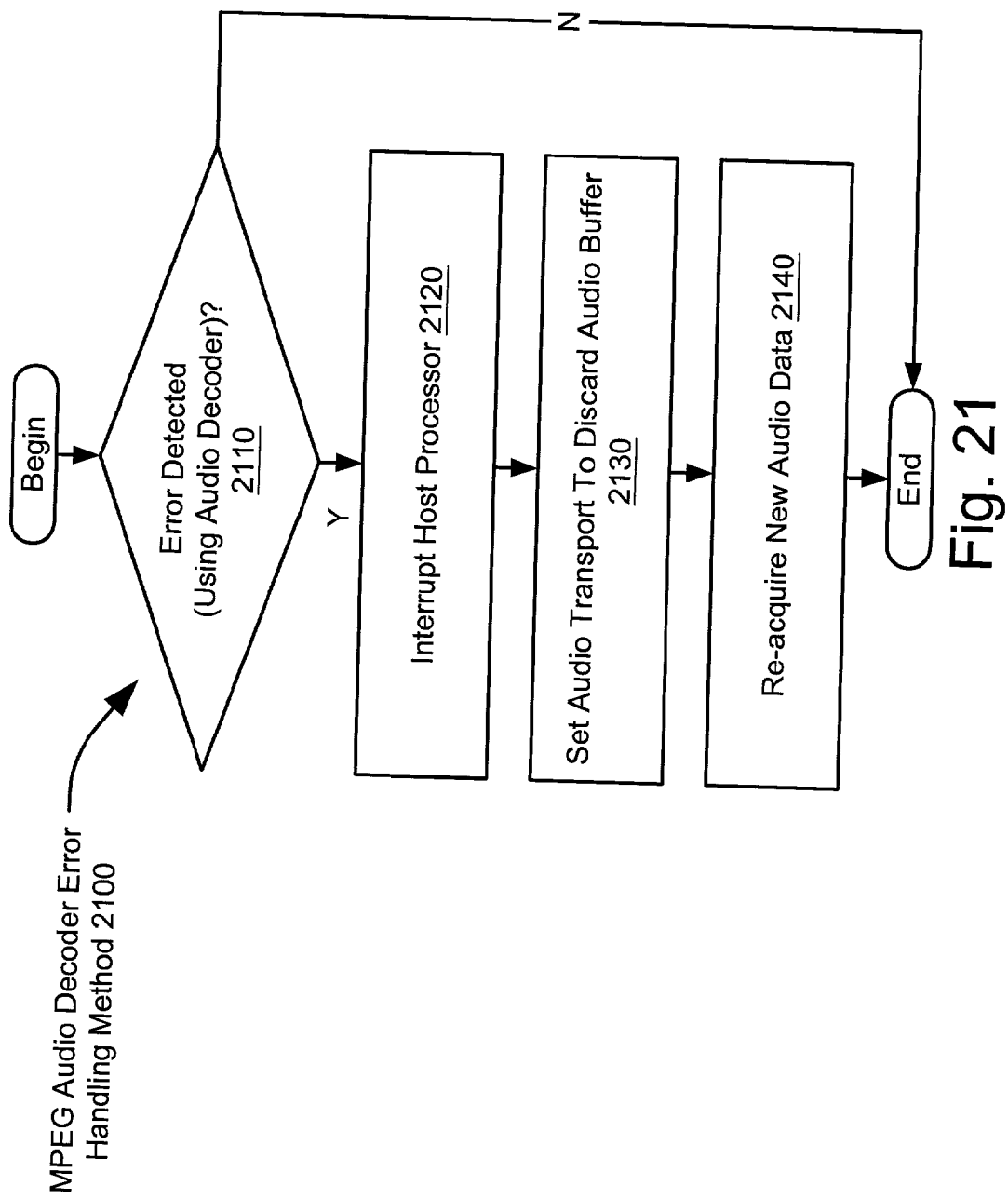
FIG. 21 is an operational flow diagram illustrating an embodiment of an MPEG audio decoder error handling method that is performed in accordance with certain aspects of the present embodiments.

FIG. 21 is an operational flow diagram illustrating an embodiment of an MPEG audio decoder error handling method 2100. In a decision block 2110, it is determined whether the audio decoder has detected any errors. If no errors are detected in the decision block 2110, then the method terminates.

However, if it is determined that the audio decoder has detected errors in the decision block 2110, then the host processor is interrupted as shown in a block 2120. The host processor will set audio transport to discard the audio buffer, as shown in a block 2130, and then it will re-acquire the new audio data as shown in a block 2140.

Figure 22:
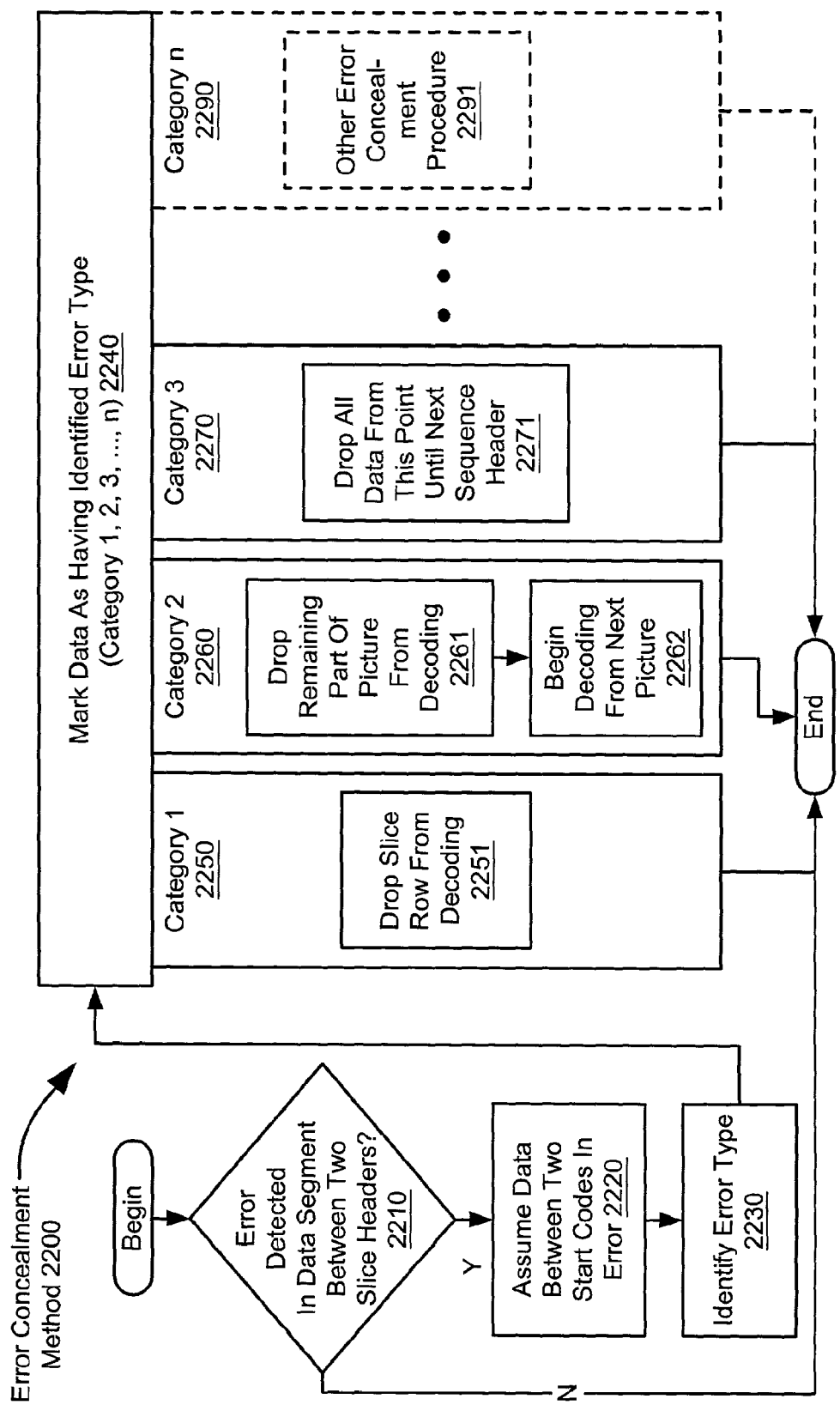
FIG. 22 is an operational flow diagram illustrating an embodiment of an error concealment method that is performed in accordance with certain aspects of the present embodiments.

FIG. 22 is an operational flow diagram illustrating an embodiment of an error concealment method 2200. In a decision block 2210, it is determined whether an error is detected in a data segment that is between two slice headers. If no such an error is detected in the decision block 2210, then the method terminates. Alternatively, if such an error is in fact detected in the decision block 2210 as being an error in a data segment that is between two slice headers, then it is assumed that the data between the two start codes is in error as shown in a block 2220. This may be based on the premise that variable length codes (VLCs) cannot typically be decoded by starting to decode at any arbitrary point in the compressed bit stream. The particular error type is identified in a block 2230.

The identified type of error is used to mark data as shown in a block 2240. Any number of various categories of data may be handled as shown by a category 1 2250, a category 2 2260, a category 3 2270, . . . , and a category n 2290. For example, the error marked on this erred data segment could be marked as error category '1' as shown in the block 2250 or error category '2' as shown in the block 2260 or category '3' as shown in the block 2270 or category 'n' as shown in the block 2290.

In certain embodiments, the video firmware would respond differently for these markings. For example, if the error type is 1, then the video decoder would just drop that slice row from decoding as shown in a block 2251. If the error type is 2, then the decode would drop the remaining part of the picture, as shown in a block 2261, and then the method would begin decoding from the next picture as shown in a block 2262. In addition, if the error type is 3, then the video decoder would drop all the data from that point till the next sequence header as shown in a block 2271. Any number of other operations may be performed in response to other error types as well. In general, if the error type is 'n', then some other error concealment procedure is performed as shown in a block 2271.

Figure 23:
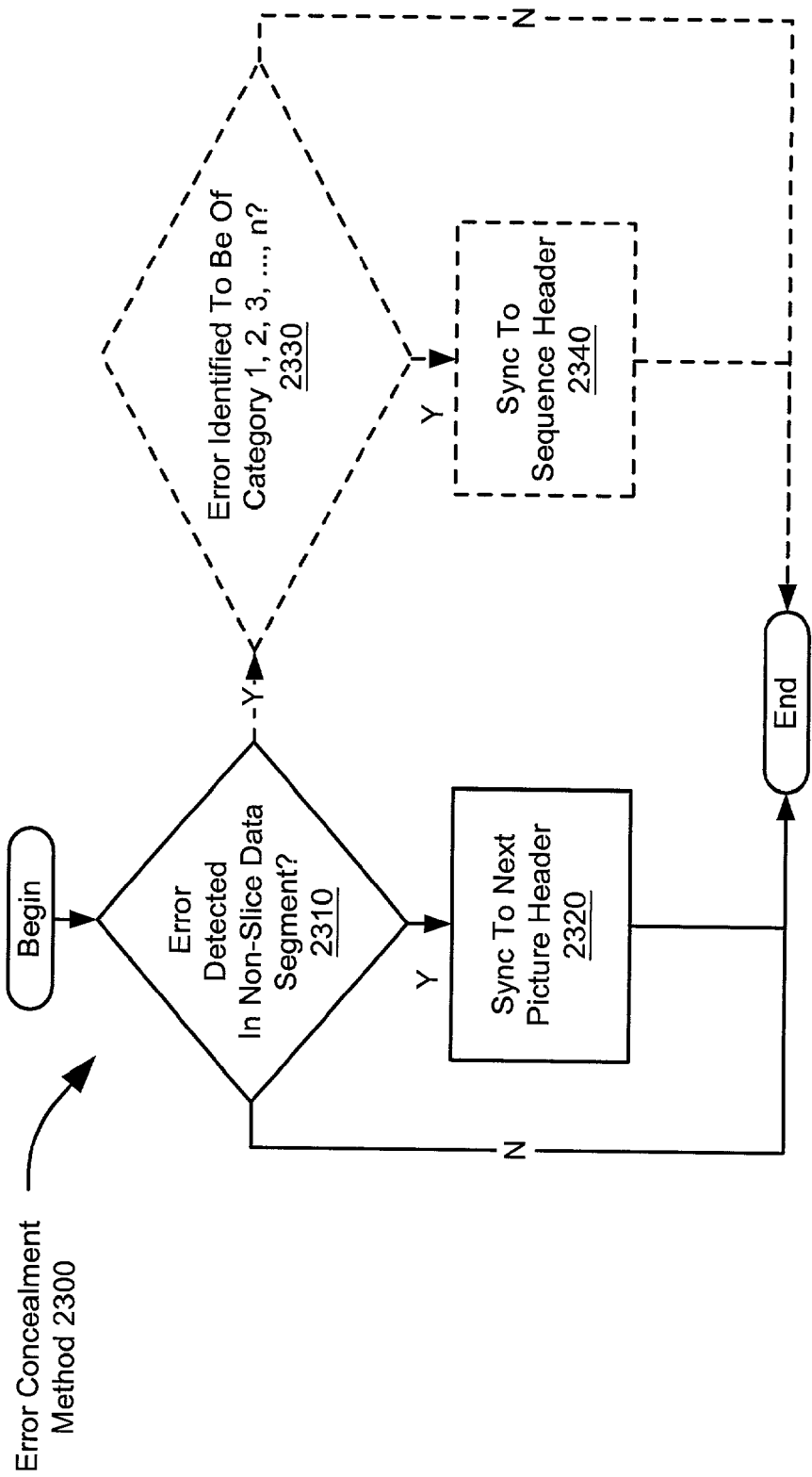
FIG. 23 is an operational flow diagram illustrating an embodiment of an error concealment method that is performed in accordance with certain aspects of the present embodiments.

FIG. 23 is an operational flow diagram illustrating an embodiment of an error concealment method 2300. In a decision block 2310, it is determined whether an error is detected as being in a non-slice data segment. If it is determined that no error is detected as being in a non-slice data segment in the decision block 2310, then the method terminates.

However, one of two options are performed when it is determined that an error is detected as being in a non-slice data segment in the decision block 2310. In one embodiment, the picture layer firmware is operable to synchronize to the next picture header as shown in a block 2320.

In another embodiment, when an error is detected in a non-slice data segment in the decision block 2310, then the error is identified to be within a particular category as shown in the decision block 2330. For example, the error may be categorized as being within error category '1', within error category '2', within error category '3', . . . , or within error category 'n' as shown in the decision block 2330. After the categorization is performed, then the method is operable to synchronize to the sequence header as shown in a block 2320. If the error cannot be categorized within the decision block 2330, then the method may either begin again or terminate (as shown by the dotted line). Again, the picture layer firmware is operable to sync to the next picture header, as shown in the block 2320, or to the sequence header if the error type is 1, 2, 3, . . . , or n, respectively, as shown in the block 2340.

Figure 24:
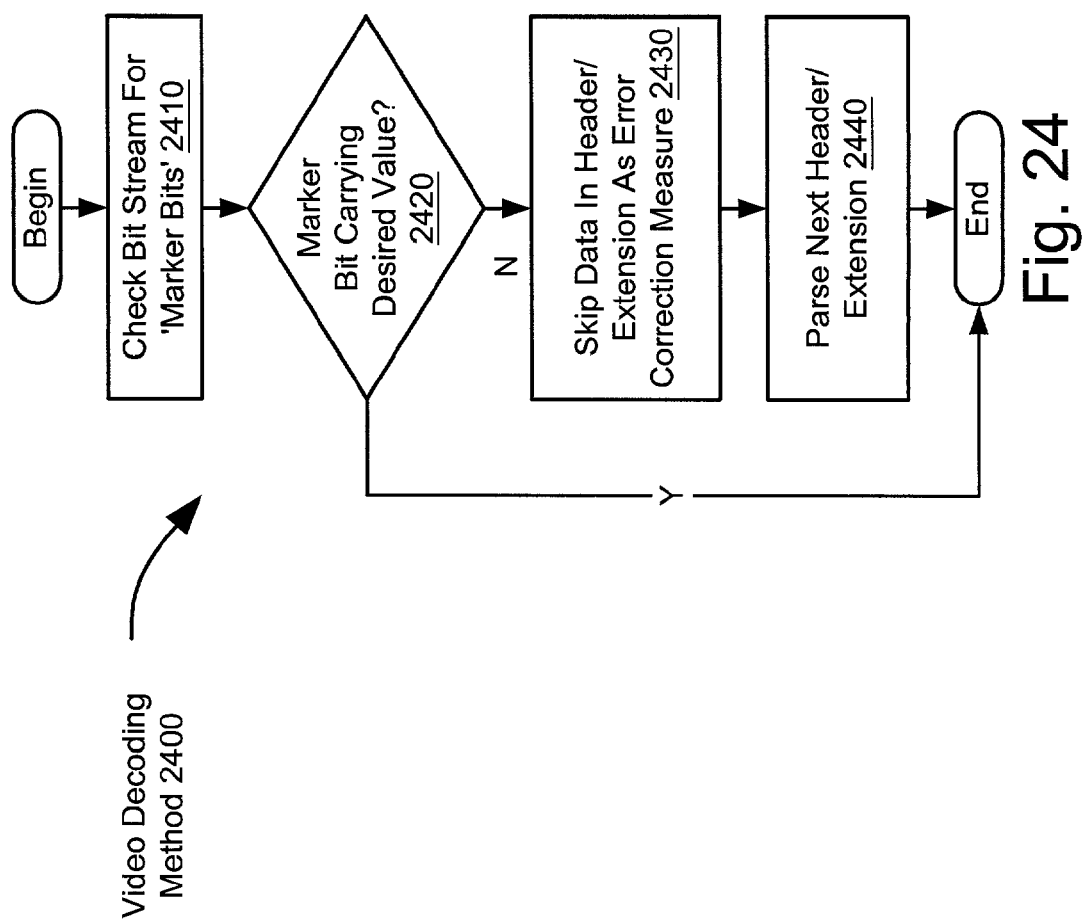
FIG. 24 is an operational flow diagram illustrating an embodiment of a video decoding method that is performed in accordance with certain aspects of the present embodiments.

FIG. 24 is an operational flow diagram illustrating an embodiment of a video decoding method 2400. The Video Decoder checks the bit stream for 'marker bits,' as shown in a block 2410, wherever they are expected to occur in the MPEG data structure.

In a decision block 2420, it is determined whether a marker bit is carrying a desired value. If it is determined that the marker bit is carrying the desired value in the decision block 2420, then this method terminates and then proceeds on to another appropriate method. However, if it is determined that the marker bit is not carrying the desired value in the decision block 2420, then the video firmware skips all the data in the header/extension as an error correction measure, as shown in a block 2430, and then the method moves on to parse the next header/extension as shown in a block 2440.

Figure 25:
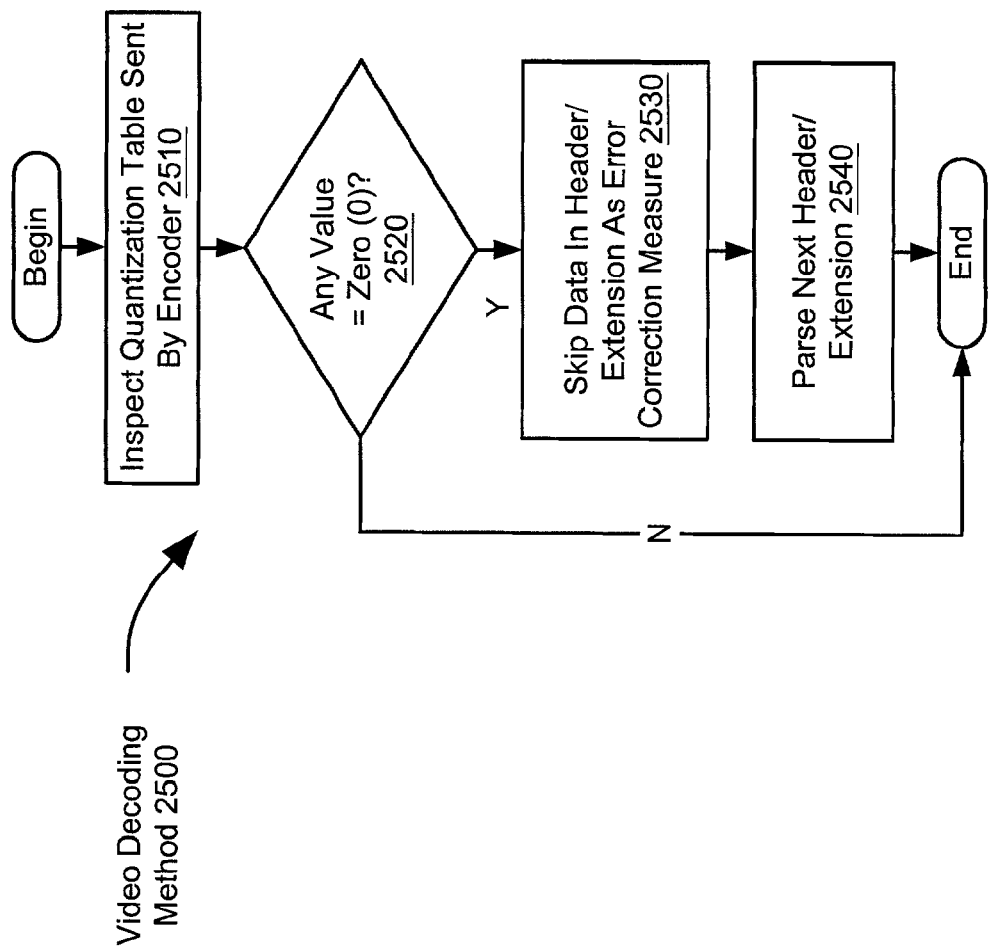
FIG. 25 is an operational flow diagram illustrating another embodiment of a video decoding method that is performed in accordance with certain aspects of the present embodiments.

FIG. 25 is an operational flow diagram illustrating another embodiment of a video decoding method 2500. The video Decoder inspects the quantization table that is sent by the encoder as shown in a block 2510. In a decision block 2520, it is determined whether any of the values are equal to zero.

If it is determined that no value is equal to zero within the decision block 2520, then the method terminates. However, if it is determined that any value in the quantization table is in fact equal to zero as shown in the decision block 2520, then the video firmware skips all the data in the header/extension as an error correction measure, as shown in a block 2530, and then it moves on to parse the next header/extension as shown in a block 2540.

Figure 26:
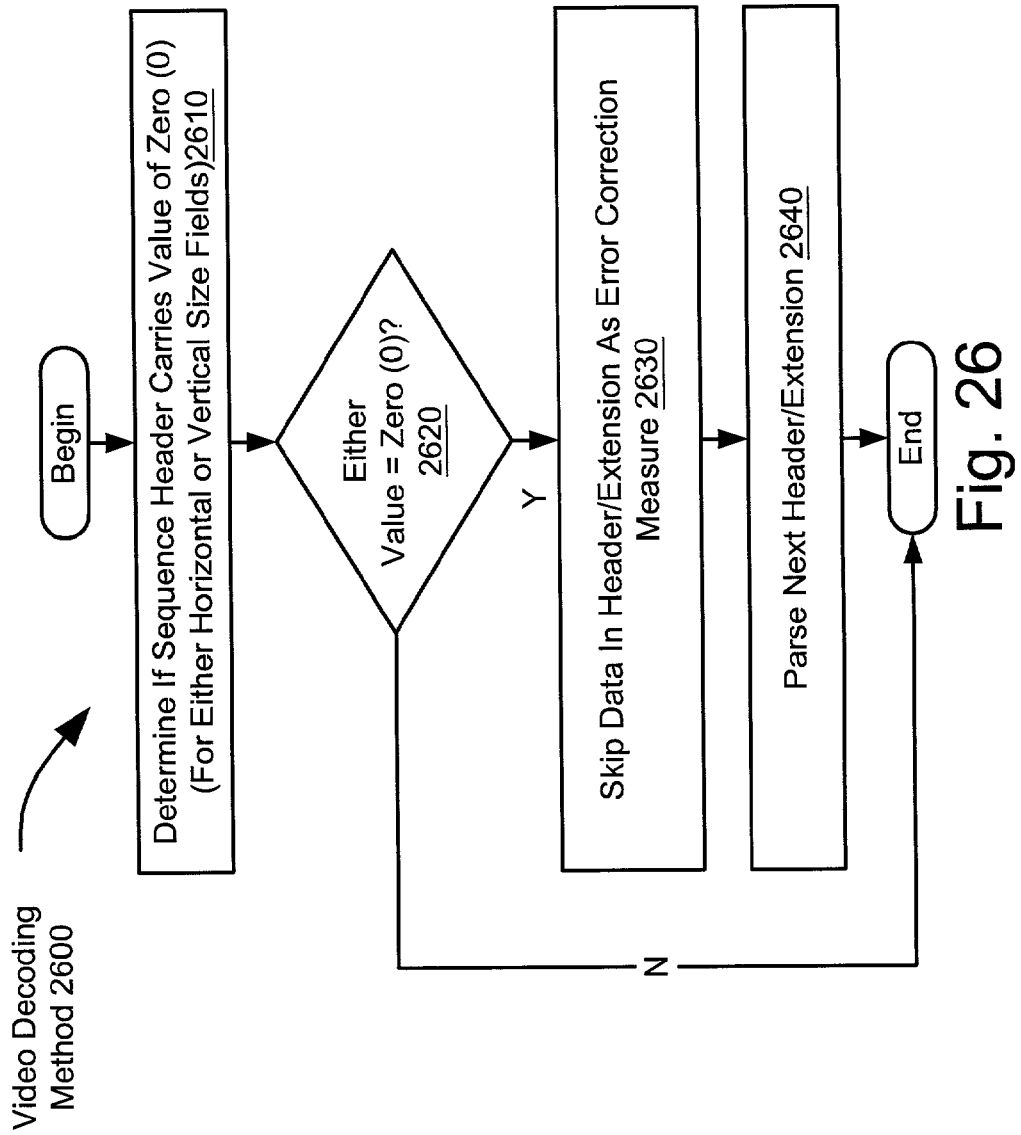
FIG. 26 is an operational flow diagram illustrating another embodiment of a video decoding method that is performed in accordance with certain aspects of the present embodiments.

FIG. 26 is an operational flow diagram illustrating another embodiment of a video decoding method 2600. In a block 2610, it is determined if the sequence header carries a value of zero for either the horizontal or the vertical size fields.

If it is determined that no value is equal to zero within the decision block 2620, then the method skips all the data in the header as an error correction measure, as shown in a block 2630, and then the method moves on to parse the next header/extension as shown in a block 2640. Alternatively, if it is determined that a value is equal to zero within the decision block 2620, then the method terminates.

Figure 27:
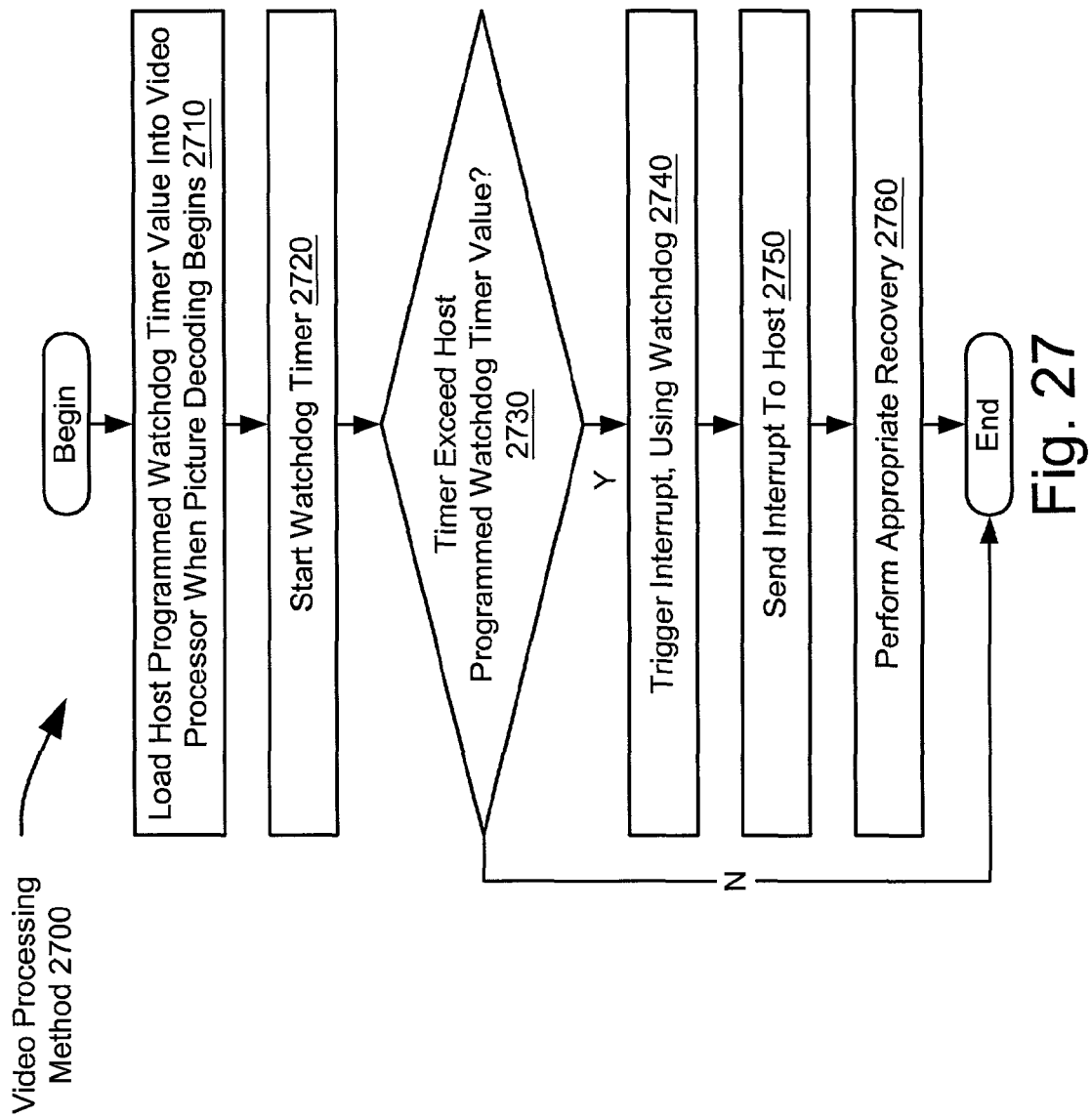
FIG. 27 is an operational flow diagram illustrating an embodiment of a video processing method that is performed in accordance with certain aspects of the present embodiments.

FIG. 27 is an operational flow diagram illustrating an embodiment of a video processing method 2700. The Video Processor has a watchdog timer that is wired out as an interrupt to the host. The timer is loaded with a Host programmed value when the decoding of a picture begins as shown in a block 2710. The watchdog timer is started in a block 2710.

It is determined in a decision block 2730 whether the timer exceeds a host programmed watchdog timer value. If it is determined that the timer exceeds a host programmed watchdog timer value in the decision block 2730, or stated another way, if it whether is determined that the decoder takes more than the specified time in the timer, then the watchdog triggers and an interrupt as shown in a block 2740; the interrupt is sent to the host as shown in a block 2750. The host processor can then take any appropriate recovery action as shown in a block 2760.

Some other aspects of various embodiments are described below. For example, a Huffman decoder may perform error detection in certain embodiments; the Huffman decoder is capable of detecting errors. The firmware proceeds to decode the next slice when an error is encountered. The Huffman decoder is also operable to monitor the run length of the decoded symbols during block processing. Run values overshooting a block size of 64 coefficients may also be marked as an Huffman Error. The Video decoder Processor checks for Invalid parameters such as an Invalid Motion Type.

However, Motion vectors may not be able to be checked leading to zones beyond the picture. The Video decoder is capable of handling any arbitrary sized Slice. It works for both, restricted and unrestricted slice structures. The Video decoder may not be operable to determine missing MBs/Slices in the picture. The Video Decoder parses the Concealment motion vectors from the stream, but it does not use them to perform any error concealment. If the size of the decoded picture is exceeding the size of the buffer, then the decoding process is curbed to the size of the buffer. If the number of MBs being decoded in the horizontal direction exceeds the horizontal size of the picture, the excess MBs are wrapped over to the next vertical position. If it is determined that the number of decoded rows exceeds the vertical size of the picture, then the further decodes may be curbed to be within the specified vertical size.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

What is claimed is:

1. A method for error concealment in a Motion Picture Expert Group (MPEG) decoder, the method comprising:
   receiving a MPEG transport stream;
   when the MPEG transport stream is a live streaming MPEG transport stream and the MPEG decoder is live decoding the live streaming MPEG transport stream:
      detecting a type of transport error within a MPEG transport stream layer of the live streaming MPEG transport stream;
      upon detecting the type of the transport error within the live streaming MPEG transport stream, subsequently handling the transport error based on the type of error such that:
         when the type of the transport error is either of a marked and an unmarked Programmed Clock Reference (PCR) discontinuity, disabling time-based management to conceal the transport error during the live decoding; and
         when the type of error is a Presentation Time Stamp (PT S) and system time clock (STC) mismatch, performing PTS and STC mismatch handling to conceal the transport error during the live decoding; and when the MPEG transport stream is a playback MPEG transport stream and the MPEG decoder is playback decoding the playback MPEG transport stream:

detecting a type of transport error within the MPEG transport stream layer of the playback MPEG transport stream;

upon detecting the type of the transport error within the playback MPEG transport stream, subsequently handing the transport error based on the type of error such that:

when the type of error is either of the marked and the unmarked Programmed Clock Reference (PCR) discontinuity, handling both the marked and the unmarked PCR discontinuity to conceal the transport error during the playback decoding; and when the transport error is a mismatch between a presentation time stamp of the MPEG transport stream and a video system time clock, and performing presentation time stamp and system time clock mismatch handling to conceal the transport error during the playback decoding.

2. The method of claim 1, further comprising:
identifying the transport error contained within the MPEG transport stream by detecting a marked discontinuity in a time-base of the MPEG transport stream.

3. The method of claim 1, further comprising:
identifying the mismatch between the presentation time stamp of the MPEG transport stream and the video system time clock.

4. The method of claim 1, further comprising:
identifying the transport error as the discontinuity of the programmed clock reference time base by detecting a programmed clock reference discontinuity flag within the MPEG transport stream.

5. The method of claim 1, further comprising:
when the transport error is the discontinuity of the programmed clock reference time base, switching back to the time-based management upon a plurality of pictures based on a previous time-base being decoded and displayed.

6. The method of claim 1, wherein the MPEG transport stream is received without data buffering.

7. The method of claim 1, wherein the playback MPEG transport stream is received from a MPEG data storage media.

8. A method for Motion Picture Expert Group (MPEG) error concealment comprising:

receiving a MPEG transport stream by a MPEG transport processor;

decoding the MPEG transport stream by a MPEG decoder;

when the decoding of the MPEG transport stream is live decoding, detecting a type of error within the MPEG transport stream, wherein a subsequent handling of the error is governed by the type of error, such that:

when the type of error is either of a marked and an unmarked Programmed Clock Reference (PCR) discontinuity, disabling time-based management to conceal the transport error during the live decoding; and when the type of error is a Presentation Time Stamp (PTS) and system time clock (STC) mismatch, performing PTS and STC mismatch handling to conceal the transport error during the live decoding; and when the decoding of the MPEG transport stream is playback decoding, detecting the type of error within the MPEG transport stream, wherein the subsequent handling of the error is governed by the type of error, such that:

when the type of error is either of the marked and the unmarked Programmed Clock Reference (PCR) discontinuity, handling both the marked and the unmarked PCR discontinuity to conceal the transport error during the playback decoding; and when the type of error is the Presentation Time Stamp (PTS) and system time clock (STC) mismatch, performing PTS and STC mismatch handling to conceal the transport error during the playback decoding.

9. The method of claim 8, further comprising:
detecting the transport error by detecting a marked discontinuity in a time-base of the MPEG transport stream.

10. The method claim 8, wherein identifying, by the MPEG decoder, the mismatch between the presentation time stamp of the MPEG transport stream and a video system time clock.

11. The method of claim 8, further comprising:
switching to a time-based management when a plurality of pictures based on a previous time-base is decoded and displayed.

12. The method of claim 8, wherein the MPEG transport stream is received without data buffering.

13. The method of claim 8, wherein the MPEG transport stream received from a MPEG data storage media.

14. A method for Motion Picture Expert Group (MPEG) error concealment by an MPEG decoder of a received MPEG transport stream, the method_comprising:

detecting a type of transport error within a MPEG transport stream layer of the received MPEG transport stream while undergoing decoding by the MPEG decoder; and concealing the transport error based on the type of the transport error, wherein:

when the decoding of the received MPEG transport stream is live decoding, subsequent concealment of the transport error being governed by the type of transport error such that:

when the type of transport error is either of a marked and an unmarked Programmed Clock Reference (PCR) discontinuity, disabling time-based management to conceal the transport error during the live decoding; and when the type of transport error is a Presentation Time Stamp (PTS) and system time clock (STC) mismatch, performing PTS and STC mismatch handling to conceal the transport error during the live decoding; and when the decoding of the received MPEG transport stream is playback decoding, subsequent concealment of the transport error being governed by the type of transport error such that:

when the type of error is either of the marked and the unmarked Programmed Clock Reference (PCR) discontinuity, handling both the marked and the unmarked PCR discontinuity similarly to conceal the transport error during the playback decoding; and when the type of error is the Presentation Time Stamp (PTS) and system time clock (STC) mismatch, performing PTS and STC mismatch handling to conceal the transport error during the playback decoding.

15. The method of claim 14, wherein a MPEG transport processor identifies the transport error contained within either of the live streaming MPEG transport stream and the playback MPEG transport stream by detecting a marked discontinuity in a time-base of the live streaming MPEG transport stream.

16. The method of claim 14, further comprising:
identifying the transport error as the discontinuity of the programmed clock reference time base by detecting a programmed clock reference discontinuity flag within the live streaming MPEG transport stream.

17. The method of claim 14, further comprising:
identifying the transport error as the discontinuity of the programmed clock reference time base by detecting a programmed clock reference discontinuity flag within the playback MPEG transport stream.

18. The method of claim 14, further comprising:
when the transport error is the discontinuity of the programmed clock reference time base, switching back to the time-based management upon a plurality of pictures of a previous time-base being decoded and displayed.

19. The method of claim 14, wherein the live streaming MPEG transport stream is received without data buffering.

20. The method of claim 14, wherein the playback MPEG transport stream is received from a MPEG data storage media.

* * * * *